US007875314B2

(12) United States Patent
Manico et al.

(10) Patent No.: US 7,875,314 B2
(45) Date of Patent: Jan. 25, 2011

(54) METHOD FOR USING RECEIVER MEDIUM HAVING ADJUSTABLE PROPERTIES

(75) Inventors: Joseph A. Manico, Rochester, NY (US); John R. Fredlund, Rochester, NY (US); Yongcai Wang, Weber, NY (US); YuanQiao Rao, Pittsford, NY (US); Douglas R. Robello, Webster, NY (US); Edward Schofield, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 120 days.

(21) Appl. No.: 11/962,570

(22) Filed: Dec. 21, 2007

(65) Prior Publication Data
US 2009/0162554 A1    Jun. 25, 2009

(51) Int. Cl.
  B05D 5/00    (2006.01)
  B05D 3/02    (2006.01)
  B41M 3/12    (2006.01)
  B41M 5/00    (2006.01)
  D21C 9/00    (2006.01)

(52) U.S. Cl. .................. 427/288; 427/373; 427/152; 428/32.1; 162/100

(58) Field of Classification Search .............. 162/100
    See application file for complete search history.

(56) References Cited

U.S. PATENT DOCUMENTS

| 3,293,114 A | 12/1966 | Kenaga et al. |
| 3,556,934 A | 1/1971 | Meyer |
| 3,779,951 A | 12/1973 | Streu |
| 4,044,176 A | 8/1977 | Wolinski et al. |
| 4,201,232 A | 5/1980 | Kaye |
| 4,268,615 A * | 5/1981 | Yonezawa .................. 430/320 |
| 4,650,421 A | 3/1987 | Anczurowski |
| 5,125,996 A | 6/1992 | Campbell et al. |
| 5,325,781 A | 7/1994 | Dupont et al. |
| 5,372,877 A * | 12/1994 | Kannankeril ........... 428/311.71 |
| 5,514,429 A | 5/1996 | Kamihgaraguchi et al. |
| 5,576,268 A | 11/1996 | Burberry et al. |
| 5,639,540 A | 6/1997 | Imaeda |
| 5,650,217 A | 7/1997 | Skrivanek et al. |
| 5,661,955 A | 9/1997 | Maida et al. |
| 5,747,225 A | 5/1998 | Manico et al. |
| 5,888,642 A * | 3/1999 | Meteer et al. ............ 428/313.5 |
| 5,902,770 A * | 5/1999 | Narita et al. ................. 503/227 |
| 5,932,053 A * | 8/1999 | Asajima et al. ............. 156/235 |
| 6,043,021 A | 3/2000 | Manico et al. |

(Continued)

FOREIGN PATENT DOCUMENTS

JP    08-224957    9/1996

(Continued)

Primary Examiner—Timothy H Meeks
Assistant Examiner—Mandy C Louie
(74) Attorney, Agent, or Firm—Boland R. Schindler

(57) ABSTRACT

A method of forming a printed image on an image receiving element is disclosed, comprising: providing an image receiving element comprising at least one activatable stiffening and/or thickening layer which comprises a polymer matrix and an activatable material; printing an image over a designated area of said image receiving element, and substantially uniformly and non-imagewise activating said activatable stiffening and/or thickening layer over the designated area of said image receiving element after step (b) to produce a printed image receiving element with an activated stiffened and/or thickened layer.

20 Claims, 17 Drawing Sheets

U.S. PATENT DOCUMENTS

| | | | |
|---|---|---|---|
| 6,152,038 A | 11/2000 | Wagner et al. |
| 6,308,883 B1 | 10/2001 | Schmelzer et al. |
| 6,352,769 B1 | 3/2002 | Mori |
| 6,364,149 B1 | 4/2002 | Smith |
| 6,381,416 B2 | 4/2002 | Manico et al. |
| 6,393,226 B1 | 5/2002 | Charlebois et al. |
| 6,393,247 B1 | 5/2002 | Chen et al. |
| 6,393,249 B1 | 5/2002 | Aslam et al. |
| 6,456,816 B1 | 9/2002 | Chowdry et al. |
| 6,463,250 B1 | 10/2002 | Chen et al. |
| 6,490,430 B1 | 12/2002 | Chen et al. |
| 6,497,998 B1 | 12/2002 | Dontula et al. |
| 6,517,346 B1 | 2/2003 | Chen et al. |
| 6,541,171 B1 | 4/2003 | Chowdry et al. |
| 6,556,798 B2 | 4/2003 | Rimai et al. |
| 6,567,641 B1 | 5/2003 | Aslam et al. |
| 6,572,810 B2 | 6/2003 | Chatterjee et al. |
| 6,582,222 B1 | 6/2003 | Chen et al. |
| 6,598,786 B1 | 7/2003 | Guo |
| 6,605,399 B2 | 8/2003 | Chowdry et al. |
| 6,638,693 B2 | 10/2003 | Anagnostopoulos et al. |
| 6,674,923 B1 | 1/2004 | Shih et al. |
| 6,698,880 B1 | 3/2004 | Campbell et al. |
| 6,714,736 B2 | 3/2004 | Manico et al. |
| 6,746,051 B1 | 6/2004 | Archie, Jr. et al. |
| 6,762,003 B2 | 7/2004 | Sunderrajan et al. |
| 6,860,308 B2 | 3/2005 | Archie, Jr. et al. |
| 6,894,000 B2 | 5/2005 | Bhambra |
| 6,911,484 B1 | 6/2005 | Goobich |
| 6,937,358 B2 | 8/2005 | Sullivan et al. |
| 7,115,084 B2 | 10/2006 | Chen et al. |
| 7,118,134 B1 | 10/2006 | Manico et al. |
| 7,122,232 B2 | 10/2006 | Robins et al. |
| 7,123,782 B2 | 10/2006 | Shih et al. |
| 2002/0114642 A1 | 8/2002 | Rimai et al. |
| 2003/0044704 A1 | 3/2003 | Chowdry et al. |
| 2003/0099495 A1* | 5/2003 | Look ............... 400/120.01 |
| 2003/0203299 A1 | 10/2003 | Bhambra |
| 2003/0219663 A1 | 11/2003 | Sunderrajan et al. |
| 2003/0232210 A1* | 12/2003 | Haas et al. ............. 428/500 |
| 2004/0022533 A1 | 2/2004 | Fredlund et al. |
| 2004/0050921 A1 | 3/2004 | Manico et al. |
| 2004/0116264 A1 | 6/2004 | Chen et al. |
| 2004/0165920 A1 | 8/2004 | Chen et al. |
| 2005/0181196 A1 | 8/2005 | Aylward et al. |
| 2005/0202164 A1 | 9/2005 | Stelter et al. |
| 2005/0287310 A1* | 12/2005 | Tamagawa ............. 428/32.14 |
| 2006/0150902 A1 | 7/2006 | Stelter et al. |
| 2007/0048023 A1 | 3/2007 | Thompson et al. |

FOREIGN PATENT DOCUMENTS

JP    10-168401    6/1998

* cited by examiner

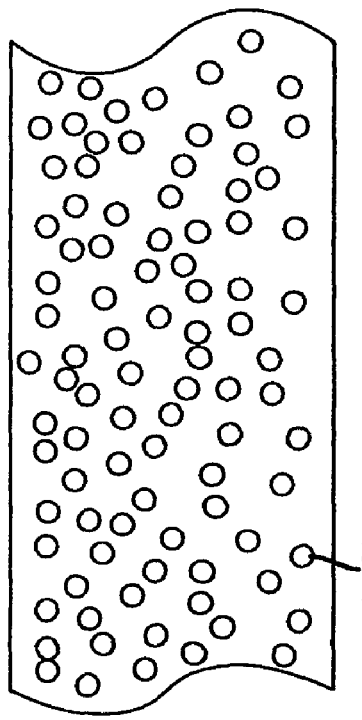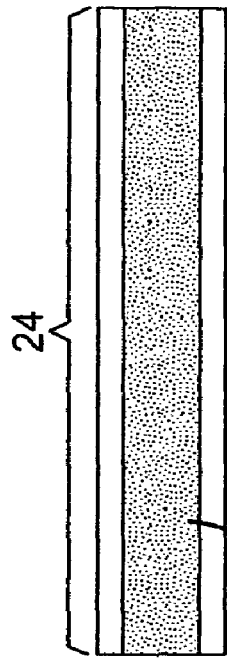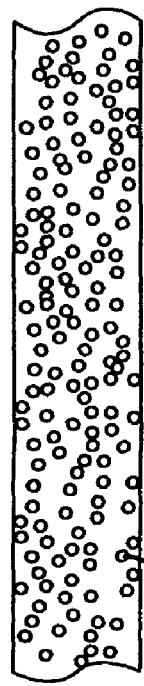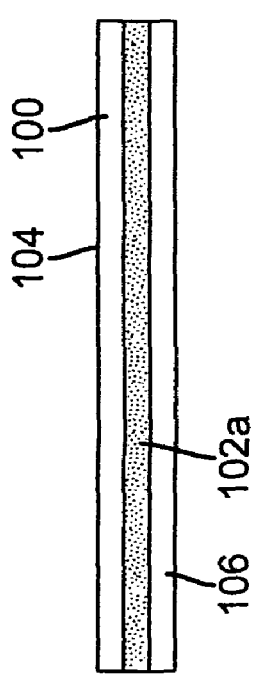

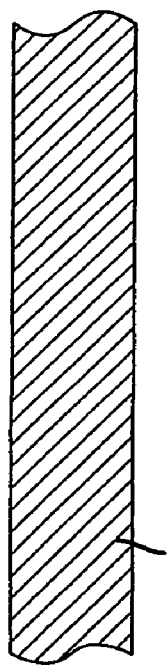
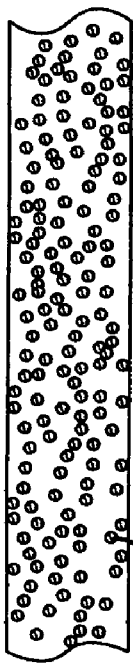
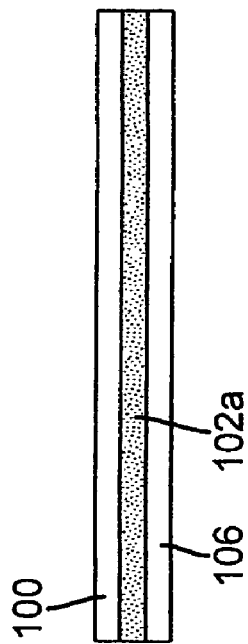
FIG. 6A  FIG. 6B  FIG. 7A  FIG. 7B  FIG. 8A  FIG. 8B

METHOD FOR USING RECEIVER MEDIUM HAVING ADJUSTABLE PROPERTIES

CROSS REFERENCE TO RELATED APPLICATIONS

Reference is made to commonly assigned, co-pending U.S. patent application Ser. No. 11/962,529, entitled "Printer and Printing Method Using Receiver Medium Having Adjustable Properties" filed herewith in the names of Manico et al., the disclosure of which is incorporated herein by reference.

FIELD OF THE INVENTION

The present invention relates to use of activatable receiver media in printers. The present invention is especially directed at providing a print media system that converts a relatively thin and flexible roll or sheet form media into a relatively thicker and/or stiffer sheet form media in a self contained unit.

BACKGROUND OF THE INVENTION

Many factors influence the perceived quality of a printed document or image. A central factor is the overall appearance of the image or other information recorded on the printed document. Another factor is the perceived quality of the receiver material upon which the image or document is printed. Images and documents that are printed using stiffer receiver media tend to be thicker and heavier and convey a greater sense of permanence, reliability and investment by the printer. Stiffer media are also suggestive of an intrinsic value of the printed image or document. Critical life documents, such as birth announcements, birth certificates, marriage certificates, college diplomas, business cards, post cards, photo-paper, mounted photographs and the like, tend to be printed on stiffer, thicker stock paper.

Such stiffer stock receiver media are, typically, more difficult to print on than conventional stock media. For example, turning ratios that are perfectly acceptable and commonly in use in thermal, electrophotographic and ink jet printers, when used with more compliant, thinner receiver medium can stretch, damage, curl or bend such stiffer receiver media. Such effects tend to diminish the appearance of the printed image or document. Many conventional consumer and retail sheet fed and roll fed digital printers are incapable of using popular types of stiffer receiver media.

Professional and commercial printing systems permit adjustments when stiffer types of receiver media are used. However, such adjustments are not typically available in retail and consumer level devices. When consumers wish to obtain printed images on stiffer types of receiver media, they typically seek out a commercial printer. It is also known to print using a more compliant receiver medium and to then mount the more compliant receiver medium on a separate stiffer or thicker and less compliant picture mounting board. Construction paper, cardboard, and foam core type boards have been employed for such use. However, this adds significant costs to the process because it involves additional materials, equipment and secondary operations.

The use of stiffer and/or thicker receiver medium can conflict with a wide variety of other considerations at the consumer and/or retail printing level. For instance, consumers have shown a preference for stand alone portable printers such as the EasyShare® line of photo printers sold by the Eastman Kodak Company, Rochester, N.Y., USA. An important consideration with such printers is that the receiver medium must be carried with the printer to the destination and that there must be a sufficient supply of receiver medium to justify bringing the printer to the destination. However, the internal storage capacity of the printer is limited in size. When stiffer receiver media are used that are also thicker than conventional receiver media, the storage capacity available in such printers is effectively reduced. This requires that such media are taken along separately which can be inconvenient.

U.S. Pat. No. 7,122,232 describes a print medium that is expandable and collapsible comprising two sheets separated by at least one collapsible brace. While such medium is designed to enable the medium to be sufficiently thin and flexible for transport through a printer when in a collapsed mode and to provide a substantially rigid structure when the collapsible brace is in an expanded position, such medium is relatively mechanically complex.

Another consideration at the consumer level is that the use of stiffer/thicker receiver medium is expensive, because such thicker or stiffer receiver medium is often solidly filled with relatively expensive materials such as pulp, fiber or polymers. Consumers often prefer to use such thicker/stiffer receiver medium only for special print jobs and reserve thinner receiver medium for other print jobs.

What is desired is a digital printer and printing system and medium that can provide printed images and documents having a desired thickness or stiffness without requiring that the consumer make complex adjustments to the operation of a printer and without imposing the need for complex mechanical systems or the financial, weight and volume difficulties typically associated with thick/stiff receiver media.

U.S. Pat. No. 6,937,358, entitled "Printable Substrate Having Controllable Thickness and Method for Making and Using Same" filed by Sullivan et al. on Nov. 13, 2001, describes a method and an apparatus for controlling the volume of a printable substrate after an image is created thereon, and is more particularly directed to the production and use of a calenderizeable substrate in which a final thickness of the substrate may be adjusted to reduce the thickness of the substrate. This is done to facilitate transport and/or storage of the document after printing. The system employed for the process includes a pair of compression rollers wherein the nip force therebetween may be adjusted. In one example, Sullivan et al. provides a method for reducing a thickness of a compressible substrate bearing an image. A compressive force is applied to the substrate to compress the substrate to a thickness less than an initial thickness. The compressive force selected to preclude the substrate returning to the initial thickness after removal of the compressive force therefrom: heat is concurrently applied to the substrate. This does not solve the above described problems relating to printing with thicker/stiffer media or enhancing consumer's quality perception and ease of use and portability.

Papers having thermally expansive materials such as hollow expandable spheres or foaming agents that contain materials that can be heated during manufacture of the paper to expand and thereby create lower weight but thicker materials are well known. Such papers are described for uses such as the formulation of packaging and containers. (See, for example, U.S. Pat. Nos. 3,293,114; 3,556,934; 3,779,951; and 3,941,634). However, approaches described therein address challenges that arise in paper manufacture, and it is assumed in these patents that such paper is fabricated with micro-beads so that as fabricated the receiver medium is thickened before printing.

Papers or other media having micro-spheres have also been used to allow relief patterns to be formed in an image after printing. See, for example, U.S. Pat. Nos. 4,268,615; 5,125,996; 5,325,781; and 5,639,540 and JP 08-224957. These references disclose, generally, the use of receiver medium having expandable micro-beads that can be expanded to enable the pattern-wise creation of relief patterns.

There remains a need for a printer, printing system, printing method and receiver medium that enable thin receiver material to be loaded into the system and that processes the receiver medium such that the output stiffness and/or thickness of the receiver medium is adjusted, especially increased.

SUMMARY OF THE INVENTION

In accordance with one embodiment, the invention is directed towards a method of forming a printed image on an image receiving element comprising: providing an image receiving element comprising at least one activatable stiffening and/or thickening layer which comprises a polymer matrix and an activatable material; printing an image over a designated area of said image receiving element, and substantially uniformly and non-imagewise activating said activatable stiffening and/or thickening layer over the designated area of said image receiving element after step (b) to produce a printed image receiving element with an activated stiffened and/or thickened layer.

ADVANTAGEOUS EFFECT OF THE INVENTION

The present invention includes several advantages, not all of which are incorporated in a single embodiment. The present invention enables use of a print media that enhances the portability of an at-home printer while producing a print with the same or superior physical characteristics associated with high quality photographic prints. The present invention employs a print and media system that allows users to select the resulting thickness or stiffness of a print without purchasing multiple media types and is compatible with home printers, kiosks, and inkjet printers, whether in large or small format.

BRIEF DESCRIPTION OF THE DRAWINGS

FIGS. 1A and B show a cross-sectional comparison of an embodiment of the activatable stiffening and/or thickening layer in a pre-activated state FIG. 1A and in the activated state FIG. 1B;

FIGS. 2A-B show a cross-sectional comparison of a multi-layer embodiment wherein top and bottom layers surround the activatable stiffening and/or thickening layer of FIG. 1 in a pre-activated state FIG. 2A and in the activated state FIG. 2B;

FIGS. 6A-B illustrate a cross-sectional comparison of an embodiment of an activatable stiffening layer in a pre-activated state FIG. 6A and in the activated stiffened state FIG. 6B;

FIGS. 7A-B show a cross-sectional comparison of a multi-layer constrained embodiment of an activatable stiffening layer of FIG. 6 in a pre-activated state FIG. 7A and in the activated state FIG. 7B;

FIGS. 8A-B show a cross-sectional comparison of an activatable stiffening and/or thickening layer with gusseted linkages in a pre-activated state FIG. 8A and in the activated state FIG. 8B;

DETAILED DESCRIPTION OF THE INVENTION

Figure 3A:
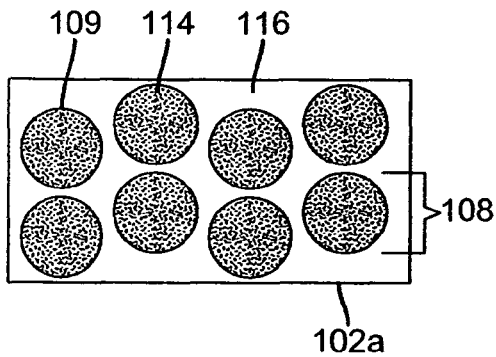
FIGS. 3A-B shows a cross-sectional comparison of an embodiment of the activatable constrained activatable stiffening and/or thickening layer in a pre-activated state FIG. 3A and in the activated state FIG. 3B.

The present invention relates to a method of forming printed image on an image receiving element comprising an activatable stiffening and/or thickening layer, wherein the activatable stiffening and/or thickening layer comprises a polymer matrix and an activatable material. The present invention utilizes an activatable layer, which enables the properties of the layer to be adjusted or controlled. Preferably, the adjusted properties are thickness and stiffness, or combinations thereof, to change the activatable layer from a relatively thin and flexible support to something that resembles "heavy stock media". The activatable layer may be used alone or in a multi-layer format. In the multi-layer format, preferably relatively very thin top and bottom layers are separated by the activatable layer. Most preferably, the image receiving element with the activatable layer or multi-layer will be used as a receiver medium for printing on one or both sides. The activatable media may be non-imagewise activatable throughout the entire area of the media, so that a designated area thereof, such as that corresponding to the entire media sheet or a portion thereof such as corresponding to an individual printed image page, thickens and/or stiffens to form a continuous, activated layer over the designated area. The activation is substantially uniform and non-imagewise over the designated area so that imagewise patterned areas of relief, such as characters, are not created. In a specific embodiment, designated areas of substantially uniform and non-imagewise activation may be separated by relatively non-activated area to allow for flexible and/or thinner lines to be formed in the medium between the designated areas.

As used herein, stiffening generally refers to a decrease in flexibility, or an increased resistance to bending, flexion, torsion, warpage, or any other form of mechanical energy applied to a layer or receiver medium. Typically, this will be measured across a surface of the layer. However, such an increase in stiffness can be measured along any edge or surface. Such an increase in stiffness can comprise a resistance to any form of deformation of the layer or receiver medium or can comprise resistance to change or an increased ability of the layer or receiver medium to absorb mechanical energy that is applied to move the layer or receiver medium out of an initial position and to use the absorbed energy to return the layer or receiver medium to the initial state. The increase in stiffness is measured by comparing the initial stiffness of the layer or receiver medium to the stiffness of the layer or receiver medium after activation and/or forming or by comparing a pre-activation stiffness of the layer to the stiffness of the layer after activation and forming.

As used herein, thickening generally refers to an increase in the thickness of a layer of the receiver medium. Such an increase in thickness can be measured along any edge, or between selected opposing surface points between edges, of the receiver medium. Such an increase in thickness may be accompanied by an increase in stiffness as described above. The increase in thickness is measured by comparing the initial thickness of the layer to the thickness of the layer after activation and/or forming.

In simplest form, the invention comprises use of a receiver medium comprising a layer of material that, when activated, demonstrates adjustable physical properties, especially those of thickness and stiffness, or combinations thereof.

Layer Matrix

The activatable layer comprises a matrix containing an ingredient or ingredients capable of being activated to produce a change in the physical properties of the layer. The matrix may be any material capable of being modified when the activatable material is activated. Preferably, the matrix is a polymer matrix. The matrix polymer of the invention can be any natural or synthetic polymer. The matrix polymers, that can be used for this purpose, can be of different architecture: linear, grafted, branch or hyperbranched. Illustrative of useful thermoplastic resins are cellulose and its derivatives (cellulosic): cellulose ethers such as methyl cellulose, ethyl cellulose, hydroxyethyl cellulose, hydroxypropyl cellulose, and cyanoethyl cellulose, and cellulose esters such as triacetyl cellulose (TAC), diacetyl cellulose (DAC), cellulose acetate propionate (CAP), cellulose acetate butyrate (CAB), cellulose acetate phthalate, cellulose acetate trimellitate and cellulose nitrate. The polymer can include polyolefins such as (linear) low and high density poly(ethylene), poly(propylene), chlorinated low density poly(ethylene), poly(4-methyl-1-pentene), and poly(ethylene) and cyclic polyolefins; poly(styrene); polyxylyene; polyimide; vinyl polymers and their copolymers such as poly(vinylcarbazole), poly(vinyl acetate), poly(vinyl alcohol), poly(vinyl chloride), poly(vinyl butyral), poly(vinylidene chloride), ethylene-vinyl acetate copolymers, and the like; polyacrylics their copolymers such as poly(ethyl acrylate), poly(n-butyl acrylate), poly(methylmethacrylate), poly(ethyl methacrylate), poly(n-butyl methacrylate), poly (n-propyl methacrylate), poly(acrylamide), polyacrylonitrile, poly(acrylic acid), ethylene-acrylic acid copolymers; ethylene-vinyl alcohol copolymers; acrylonitrile copolymers; methyl methacrylate-styrene copolymers; ethylene-ethyl acrylate copolymers; methacrylated butadiene-styrene copolymers, and the like; polycarbonates such as poly(methane bis(4-phenyl) carbonate), poly(1,1-ether bis(4-phenyl) carbonate), poly(diphenylmethane bis(4-phenyl)carbonate), poly(1,1-cyclohexane bis(4-phenyl)carbonate), poly(2,2-bis-(4-hydroxyphenyl) propane)carbonate and the like; polyether; polyketone; polyphenylene; polysulfide; polysulfone; polylactones such as poly(pivalolactone), poly(caprolactone) and the like; polyurethanes; linear long-chain diols such as poly(tetramethylene adipate), poly(ethylene adipate), poly(1,4-butylene adipate), poly(ethylene succinate), poly(2,3-butylenesuccinate), polyether diols and the like; polyether ether ketones; polyamides such as poly (4-amino butyric acid), poly(hexamethylene adipamide), poly(6-aminohexanoic acid), poly(m-xylylene adipamide), poly(p-xylyene sebacamide), poly(2,2,2-trimethyl hexamethylene terephthalamide), poly(metaphenylene isophthalamide) (Nomexâ), poly (p-phenylene terephthalamide) (Kevlarâ), and the like; polyesters such as poly(ethylene azelate), poly(ethylene-1,5-naphthalate), poly(ethylene-2,6-naphthalate), poly(1,4-cyclohexane dimethylene terephthalate), poly(ethylene oxybenzoate) (A-Tellâ), poly(para-hydroxy benzoate) (Ekonolâ), poly(1,4-cyclohexylidene dimethylene terephthalate) (Kodelâ) (cis), poly(1,4-cyclohexylidene dimethylene terephthalate) (Kodeâl) (trans), polyethylene terephthlate, polybutylene terephthalate and the like; poly(arylene oxides) such as poly(2,6-dimethyl-1,4-phenylene oxide), poly(2,6-diphenyl-1,4-phenylene oxide) and the like; poly(arylene sulfides) such as poly(phenylene sulfide) and the like; polyetherimides; ionomers; poly(epichlorohydrins); furan resins such as poly(furan); silicones such as poly(dimethyl siloxane), poly(dimethyl siloxane), poly(dimethyl siloxane co-phenylmethyl siloxane) and the like; polytetrafluoroethylene; and polyacetals. Copolymers and/or mixtures of these aforementioned polymers can also be used.

Preferred polymers that can be used for support material include thermoplastic polymers such as vinylidene chloride, acrylonitrile, methylmethacrylate, polystyrene, polyacrylic, and polyxylyene, polyvinylcarbazole, polyester, polyamide, polyimide, polycarbonate, polyether, polyketone, polyphenylene, polysulfide, polysulfone, and cyclic polyolefin.

Preferably the polymer matrix can be softened by exposure to heat or light prior to the modification, such as expansion and chemical reaction. For expansion, most preferably, the polymer matrix has a glass transition temperature that is below the temperature for heat expansion, and has desirable viscoelastical properties to allow sufficient stretching of the polymer matrix for the cell walls between the gas pockets without premature rupture. If the matrix is too rigid, cells do not form, and the matrix may split or crack. If the matrix is too fluid, the gas bubble rises through the substrate and escapes. The chemical reaction and gas release will typically be coordinated and balanced to achieve the desired result. The gas must be generated and cells must be formed in the time frame during which the polymer matrix possesses the Theological properties necessary for good expansion. The time frame between activation of the activatable layer and the conclusion of the modification of the properties of the layer, is referred to herein as a post-activation stiffening delay. For example, if the activatable layer is activated and stiffens, the delay to completion of stiffening is referred to as the post-activation stiffening delay.

Activatable Material

In any of the embodiments described herein, activatable material may be any material and can take any of a variety of forms, such as a gas, a liquid, or a solid. The activatable material is intended to expand, stiffen or otherwise adjust to produce another physical modification after activation.

The activatable material may be activated in a variety of ways. The material may be activated by exposure to heat, pressure, radiation, chemical reaction or a combination thereof. The material may comprise a reactive compound which diffuses into the matrix to react with another reactive component or the matrix itself to produce activation.

In one embodiment, the activatable material is activated by applied pressure. An activation system may include pinch rollers that are biased toward each other across a nip. The rollers pressurize the layer or receiver medium as it passes through nip. In alternative embodiments, pinch rollers could be heated, adapted to radiate energy or treated with a material that induces activation of the layer or receiver medium. Any combination of such actions can also be taken.

In another embodiment, the activatable material may be activated by radiation. An energy source in the form of a light emitter or plurality of light emitter that radiates light at a wavelength or range of wavelengths may be used to activate the layer or receiver medium. UV, IR, visible light, laser or microwave radiation may all be used to activate the medium.

The type of energy required to activate an activatable stiffening and/or thickening layer and the extent of the exposure of a receiver medium or layer to such energy will be a function of the desired change in properties, such as stiffness and/or thickness, and a function of the nature of the materials and/or mechanism used to form the layer or receiver medium.

In a second preferred embodiment, the expandable layer comprises a polymer matrix embedded with particles sensitive to heat or radiation treatments. The particles may comprise a foaming agent that produces gases upon heating and generate cells (gas pockets) in the polymer matrix. The generated gas pocket will cause the polymer matrix to expand to increase the layer thickness. The particles may also comprise a mixture of foaming agent and a radiation sensitive compound. Upon exposure, the radiation sensitive compound absorbs the radiation and converts the radiation to heat that in turn causes the foaming agent to form gas and generate cells. The particle may further comprises a reactive compound which upon heating diffuses into the polymer matrix to enable a crosslinking reaction with a functional group attached to the polymer to further increase the stiffness of the layer.

For example, the activatable material may be a combination of a radiation sensitive polyfunctional monomer and a photo-initiator. In this case, the radiation sensitive monomer is sensitive to a wavelength of radiation that is different from that for the photo-initiator. For example, the radiation sensitive compound may be sensitive, for example, to infrared light, while the photo-initiator may be sensitive to ultraviolet light. Heat can be generated by infrared exposure to cause the polyfunctional monomer and photo-initiator to mix with the polymer matrix. The polymers in the polymer matrix may further contain a functional group that is reactive with a free radical for form a chemical bond. Exposure with separate ultraviolet light will cause the photo-initiator to generate a free radical that, in turn, initiates a cross-linking reaction between the polyfunctional monomer and the functional groups attached to the polymers.

Activation occurs after printing. Other functions may also be performed by the activation, beyond that of adjusting or modifying the layer or receiver media physical properties. For example, when activation is by exposure to light after printing, this light can perform two functions: activation of the activatable stiffening and/or thickening layer and curing or drying any inks, dyes or coatings applied to the receiver medium during printing. In a preferred embodiment, the activation, such as exposure to light or heat, has no or minimal effect on the printed image. In another embodiment, the activation has a known effect on the printed image that can be compensated for in printing.

Partial activation may also occur during or before printing of the layer or receiver medium. In certain embodiments, pre-printing partial stiffening and/or thickening of the receiver medium can be put to advantageous effect. In particular, the receiver medium in a printer is conventionally moved relative to a core by providing a receiver medium transport path that advances the receiver medium using a plurality of pairs of motor driven pinch rollers that are arranged to pull rather than push the receiver medium along the receiver medium transport path. One of the principle reasons for this is that receiver medium is typically relatively pliable and tends to flex and/or get caught within the receiver medium transport path when pushed or thrust through the system. This makes it difficult to properly position receiver medium by thrusting receiver medium from the supply end. Pre-printing partial stiffening of media, e.g., may be employed to control stiffening such that the media would transport through the system more effectively while still maintaining a required degree of flexibility to enable transport through a tortuous printing path, with final activation and complete stiffening and/or thickening performed after printing to obtain a printed image with desired final stiffness.

After activation, the layer or multi-layer structure must be stable. For example, in the case of expansion, the gas must not diffuse out of the cells too quickly, thereby causing collapse or excessive shrinkage.

Activatable Thickening Layer

In one embodiment, the activatable layer is an activatable thickening layer. The layer expands upon activation. In this embodiment, the activatable material dispersed in the matrix is expandable. When activated, the layer expands and to change the layer from a relatively thin flexible support to something that resembles relatively thicker "heavy stock media".

In one example, the activatable material expands when an activating energy or activating material is applied that causes the temperature of expandable material to rise. In another embodiment, the activatable material is confined within cells. Activation of the material enlarges the cells at a rate that is beyond the range of elastic expansion for cell walls. For example, where cells contain an expandable material that is in the form of a gas, the gas expands according to the ideal gas law with increased heat, this, in turn, pressurizes the cells, causing the cell walls to expand beyond the point at which they are elastically expandable. The gas encapsulated by the cells can be any gas, including $N_2$, $CO_2$, and He.

In the case of expansion, the gas must not diffuse out of the cells too quickly, thereby causing collapse or excessive shrinkage. The stability of the cells formed may depend on the solubility and diffusitivity of the gases generated. It is highly desirable that the gases have a poor solubility and lower diffusitivity in the polymers contained in the polymer matrix.

In another embodiment of this type, activatable stiffening and/or thickening layer can incorporate a material with a foaming agent which can be physical or chemical. Physical foaming agents function as gas source by going through a change in the physical state. Such physical foaming agents may utilize EXPANCELL® microspheres, sold by Akzo Nobel, which are small spherical plastic particles in the form of a polymer cell encapsulating a gas. When the gas inside the cell is heated, it increases its pressure and the thermoplastic cell softens, resulting in a dramatic increase in the volume of the microspheres. Other examples of such micro-spheres include "Swell Touch" capsule paper made by Zychem Ltd. in the United Kingdom. Zychem is a manufacturer of a range of products including specialist papers and equipment for producing tactile diagrams (Braille paper).

In another example, the cells can contain an activatable material that is in the form of liquid at normal temperatures and which then changes state into gas phase when an activation energy is applied to cause the temperature of the liquid activatable material to rise above its boiling point. This can create a pressure that increases the volume occupied by the cells to a point that is beyond the point of elastic expansion of the cell walls, thus expanding cell walls into a new, larger shape and causing an increase in the stiffness and/or thickness of the receiver medium after activation. Examples of liquid type expandable materials that can be encapsulated by the cells include water, alcohols and low molecular hydrocarbons, such as isobutene and isopentane. Other examples of liquid type expandable materials that can be encapsulated in cells include liquids formed by polymerising ethylenically unsaturated monomers in the presence of a propellant. Detailed descriptions of various expandable microspheres and their production can be found in, for example, U.S. Pat. Nos. 3,615,972, 3,945,956, 5,536,756, 6,235,800, 6,235,394 and 6,509,384, and in EP 486080, all incorporated herein by reference.

In still another embodiment, the cells can contain a solid expandable material that sublimes or otherwise changes state into a liquid when the temperature of the solid expansive material is above the sublimation temperature, causing the occupied volume of each of cells to increase. When the cells expands beyond the point of elastic expansion, the total volume of each cell increases.

The walls of microcells which may be employed in the activatable layer can be made in certain embodiments by various polymers with a glass transition temperature lower than the temperature used to expand expandable material. The polymers in all the layers may be either an addition polymer or a condensation polymer.

In one embodiment, the cells can have a diameter between 1 micron and 40 micron before expansion and can expand to 1.5-40 times of the original diameter when the energy is applied to activate, for example, raise the temperature, of the activatable, typically expandable, material. In a preferred embodiment, the application of energy has no or minimal effect on the printed image. In another embodiment, the application of energy has a known effect on the printed image that can be compensated for in printing.

FIG. 1A shows a magnified cross-section of an activatable thickening layer 102a in a pre-activated state. FIG. 1B shows a magnified cross-section of one embodiment of an activatable thickening layer 102b in the activated state. FIG. 2A shows a multi-layer structure, useful as a receiver medium 24, which has a printable layer 100, having a printable surface 104, and an activatable stiffening and/or thickening layer 102a in a pre-activated state. FIG. 2B shows a magnified cross-section of a multi-layer structure having an activatable thickening layer 102b in the activated state. Printable layer 100 can be made of materials and/or processed so that a printer can form print (also referred to herein as printing or printed matter) images, text, graphics, textures or any other form of printable subject matter on a printable surface 104 thereof. As is also shown in FIGS. 2A and 2B, an optional support layer 106 is also provided on a side of activatable layer 102 that is opposite from printable layer 100.

In an alternative embodiment, activatable material can be made of super-absorbing polymers (SAP). When water is applied, this type of activatable material absorbs the water and increases volume and expands, thereby increasing the thickness of the layer. Super-absorbing polymers generally consist of a partially neutralized lightly cross-linked polymer network, which is hydrophilic and permits swelling of the network once submerged in water or an aqueous solution such as physiological saline. The cross-links between the polymer chains assure that the super-absorbing polymers do not dissolve in water. Super-absorbing polymers are often applied in form of small particles, such as fibers or granules. The super-absorbing polymers can be a cross-linked starch-polyacrylate, and partially neutralized polyacrylic acid. The activatable layer can comprise a single polymer or a mixture of polymers, or super-absorbing polymers. In a preferred embodiment, the application of water which may be used to activate the super-absorbing polymers has no or minimal effect on the printed image. In another embodiment, the application of water has a known effect on the printed image that can be compensated for in printing.

In a further embodiment, the activatable material may be activated to expand by the inclusion of chemical foaming agents of the type that produce gas by a chemical reaction. The reaction may be thermal decomposition or a reaction between two components. The choice of a chemical foaming agent is determined by its thermal decomposition properties and the properties of the polymers in the polymer matrix at the expansion temperature. Examples of chemical foaming agents include sodium bicarbonate, dinitrosopentamethylenetetramine, p-toluenefofonyl hydrizide, azodicarbonamide, 5-phenyltetrazole, diisopropylhydrazodicarboxylate, sodium borohydride, and the like.

Activatable Stiffening Layer

In one embodiment, the activatable layer is an activatable stiffening layer. The layer stiffens upon activation. In this embodiment, the activatable material dispersed in the matrix stiffens the matrix after activation. When activated, the layer stiffens, changing from a relatively flexible support to something that resembles relatively stiffer "heavy stock media".

FIG. 6A shows a magnified cross-section view of stiffening layer 102a in a pre-activated state. FIG. 6B shows a magnified cross-section view of stiffening layer 102b in an activated state. FIG. 7A shows a magnified cross-section view of stiffening layer 102a in a pre-activated state as part of a multi-layer structure. FIG. 7B shows a magnified cross-section view of stiffening layer 102b in an activated state as part of a multi-layer structure.

As is illustrated in FIGS. 6 and 7, a material change occurs in activatable stiffening layer 102 when an activating energy or an activating material is applied. Activatable stiffening layer 102 is made from materials that stiffen upon activation without necessarily substantially increasing the overall thickness of the layer or layered structure. This can be accomplished by the use of materials that react to an activating energy or an activating material in any manner that tends to increase the resistance of activatable stiffening and/or thickening layer to bending, flexing, or other deflection of the activatable stiffening and/or thickening layer.

Figure 5A:
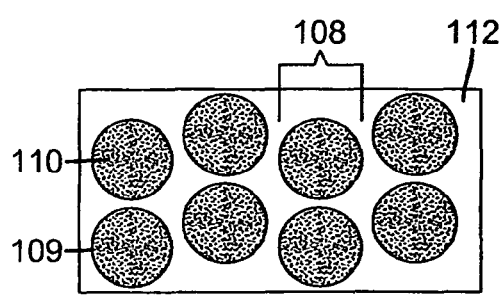
FIGS. 5A-B illustrate a cross-sectional comparison of an activatable stiffening and/or thickening layer utilizing encapsulated activation agents in a pre-activated state FIG. 5A and in the activated state FIG. 5B.

In one embodiment of this type, activatable stiffening layer 102 can be made from a two-part material, such as a two-part resin, that stiffens when the two parts of the material are combined. In this example, the two resin parts can be separated in some fashion, for example, by encapsulating the parts or providing a separator between individual layers of material with the separation being provided so that it can be broken down or removed when the activating energy or activating material is applied. In a specific example, illustrated by FIG. 5A, a first material 110 in a two-part material combination can be contained in cells 108, apart from a second material 112, by the cell wall 109 of cell 108. Micro-beads, or other forms of containment structures, provide cell walls 109 that can hold first material 110 apart from second material 112. During activation, cells 108 can be exposed to various forms of energy, such as mechanical, sonic, thermal, or electromagnetic energy or to a material, such as an enzyme or solvent, that compromise the containment provided by cell walls 109, such as by creating openings 113 in cell walls 109. Cells 108 can also be opened by applying energy to cells 108 such that the material contained therein expands and bursts through cell walls 109 to combine with a second material 112. In other embodiments of this type, a first material can be maintained within a second material, but without a separator, by maintaining the first material in a phase or form that will not readily react with the second material, but that can be converted into a form that will react with the second material by exposure to activating energy or activating material. In a preferred embodiment, the exposure to activating energy or activating material has no or minimal effect on the printed image. In another embodiment, the exposure to activating energy or activating material has a known effect on the printed image that can be compensated for in printing.

Figure 5B:
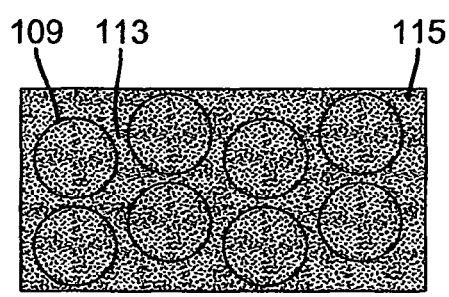

In FIG. 5B, first material 110 escapes from cells 108 and combines with second material 112 to provide a stiffened and/or thickened combination material 115.

Activatable Constrained Layer

In one embodiment, the activatable layer is an activatable stiffening and/or thickening layer. The layer thickens or stiffens, or a combination thereof, upon activation. In this embodiment, the activatable material dispersed in the matrix stiffens the matrix after activation. When activated, the layer stiffens to change it from a thin flexible support to something that resembles "heavy stock media".

Figure 3B:
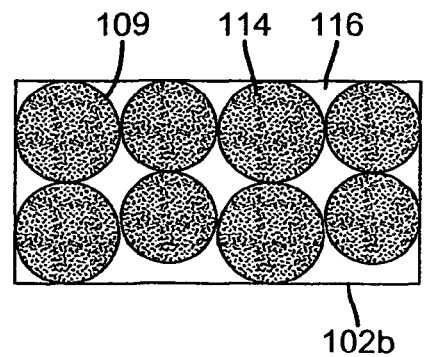
Figure 4A:
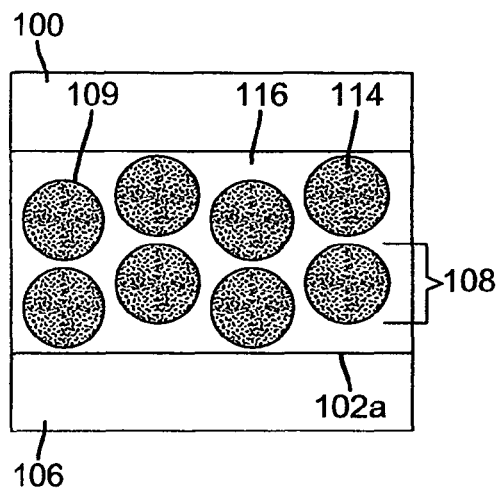
FIGS. 4A-B show a cross-sectional comparison of a multi-layer constrained embodiment of the activatable stiffening and/or thickening layer of FIG. 3 in a pre-activated state FIG. 4A and in the activated state FIG. 4B.
Figure 4B:
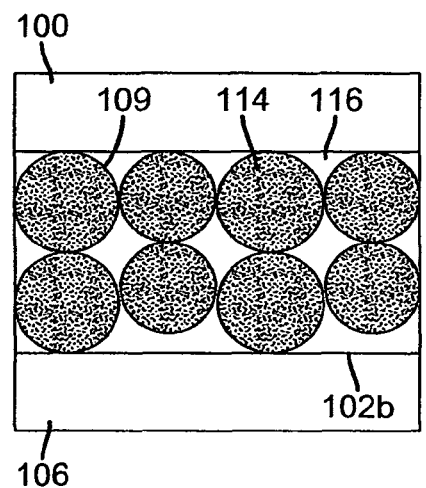
Figure 14:
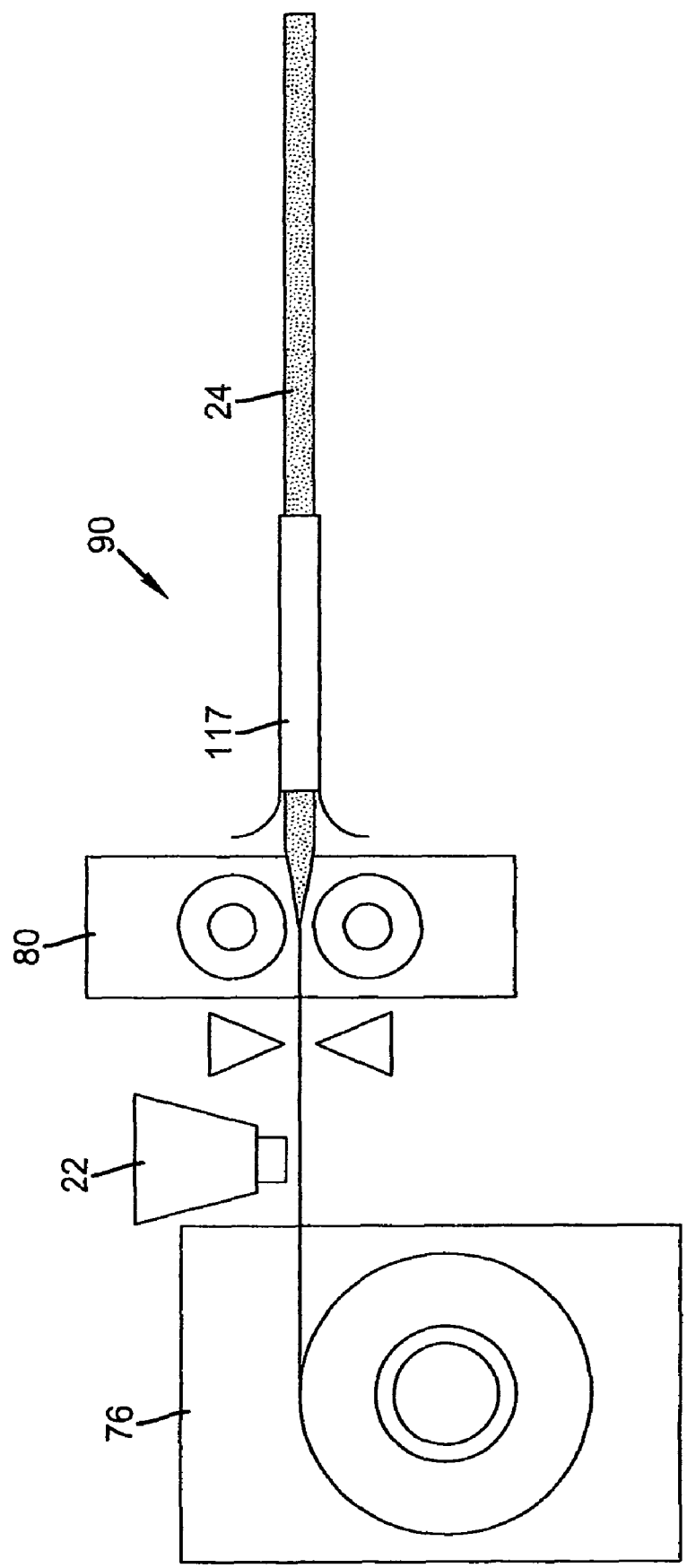
FIG. 14 shows a simplified printing system for using a receiver media comprising an activatable stiffening and/or thickening layer.
Figure 15:
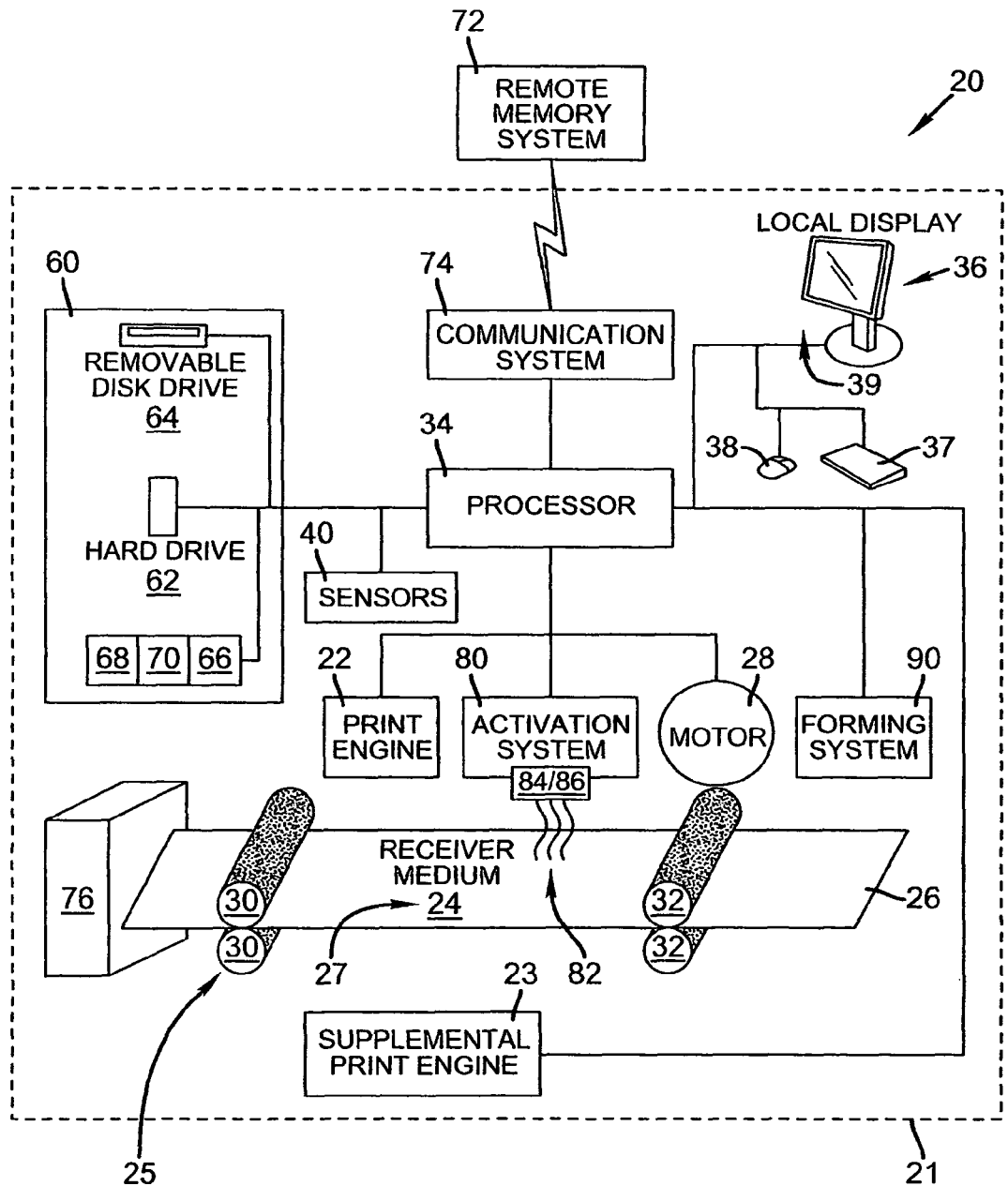
FIG. 15 illustrates one embodiment of a printer for use with a receiver media comprising an activatable stiffening and/or thickening layer.

FIG. 3B illustrates a magnified cross-section of another embodiment of the activatable stiffening and/or thickening layer that can stiffen by expanding without a substantial increase in thickness from a pre-activated state FIG. 3A. FIG. 4B illustrates a magnified cross-section of another embodiment of the activatable stiffening and/or thickening layer, surrounded by additional continuous layers to form a multi-layer structure, that can stiffen by expanding without a substantial increase in thickness from a pre-activated state FIG. 4A. The outermost layers in FIG. 4 are continuous layers that are not expandable and thereby constrain the expansion of the activatable layer, resulting in stiffening instead of expansion of the dimension of the medium itself. In this embodiment, the activatable stiffening and/or thickening layer has cells 108 having walls 109 that contain an expandable material 114 that is located within a matrix material 116. Here, expandable material 114 reacts to an activating energy or an activating material by attempting to expand, and is constrained in some manner. This constraint is provided in the form of some structure or system that limits the extent to which an activated layer can expand. In FIG. 4, the constraint is provided by the surrounding layers 100 and 106 in the multi-layer structure. This causes cell walls to enlarge to a size and to remain at the enlarged size, which in turn generates increased pressure between printable layer 100 and support layer 106 causing an increase in the stiffness of receiver medium 24 after activation. In the embodiment that is illustrated in FIGS. 14 and 15, a forming system 90 can provide an upper constraint on the expansion of the activatable stiffening and/or thickening layer, while receiver medium transport system 26 provides a lower or reference constraint on the extent of the expansion. Other structures can also be used to constrain or limit expansion, including print engine 22 and form 117.

Figure 10A:
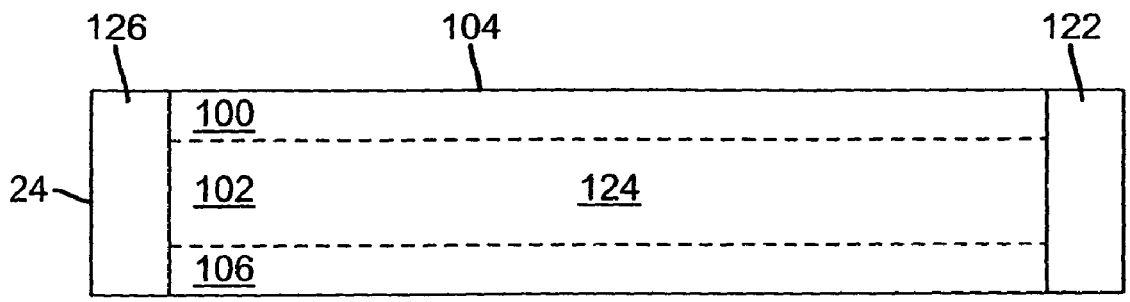
FIGS. 10A-C shows an alternative embodiment of a multi-layer constrained embodiment of the activatable stiffening and/or thickening layer in cross-section FIGS. 10A and 10B and as viewed from the top of FIG. 10C.
Figure 10B:
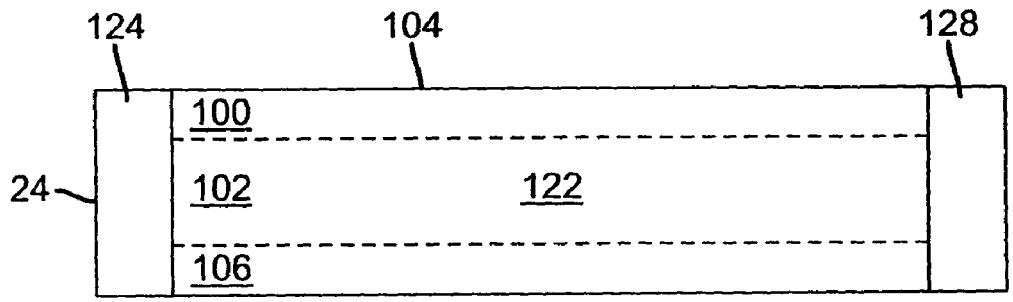
Figure 10C:
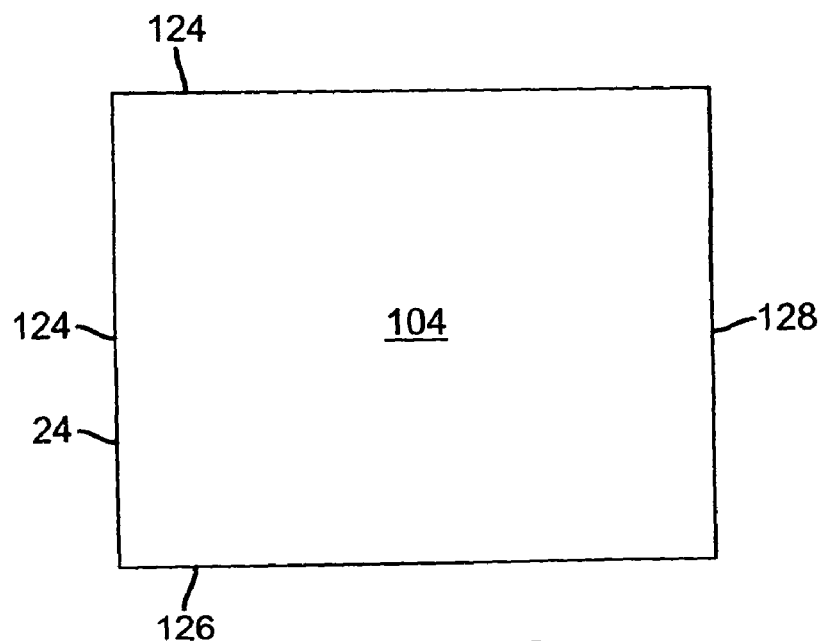

In an alternative embodiment shown in FIG. 10, a constraint on an extent of expansion can be provided by joining an optional support layer 106 to printable layer 100, having a printable surface 104, by linkages 122, 124, 126, and 128, used to join optional support layer 106 to printable layer 100. This allows printable layer 100 and support layer 106 to be separated by no more than a predefined distance. In the illustrated embodiment, linkages 122, 124, 126 and 128 link edges of printable layer 100 to edges of support layer 106. However, it is contemplated that, in other embodiments, other linkages can be provided in areas that are not only along such edges.

In any of the constrained embodiments, expandable material 114 can take any of a variety of forms, such as a gas, a liquid, or a solid. In one example, shown in FIG. 3, expandable material 114 expands when an activating energy or activating material is applied to activatable layer 102a that causes the temperature of expandable material 114, that is within cells 108, to rise and enlarge cells 108 at a rate that is beyond the range of elastic expansion for cell walls 109. For example, where cells 108 contain an expandable material 114 that is in the form of a gas, the gas expands according to the ideal gas law with increased heat. This pressurizes cells 108 causing cell walls 109 to expand beyond the point at which they are elastically expandable. This causes cell walls 109 to enlarge to a size and to remain at the enlarged size, which in turn generates increased pressure between printable layer 100 and support layer 106, causing an increase in the stiffness of the constrained activatable stiffening and/or thickening layer after activation. The gas encapsulated by the cells 108 can be any gas including $N_2$, $CO_2$, and He.

Figure 9A:
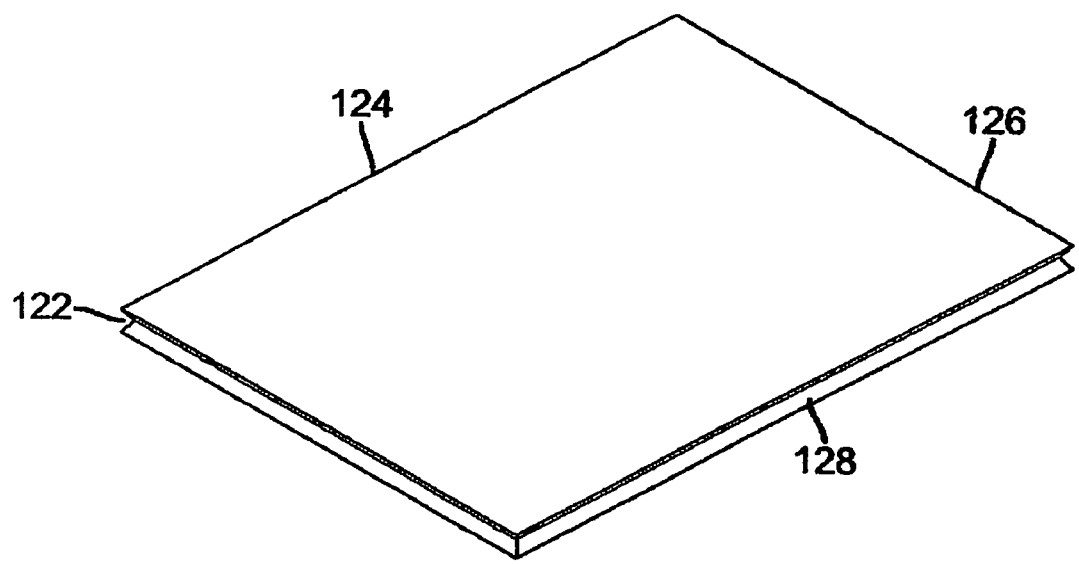
FIGS. 9A-B show a three dimensional comparison of the activatable stiffening and/or thickening layer with gusseted linkages in a pre-activated state FIG. 9A and in the activated state FIG. 9B.
Figure 9B:
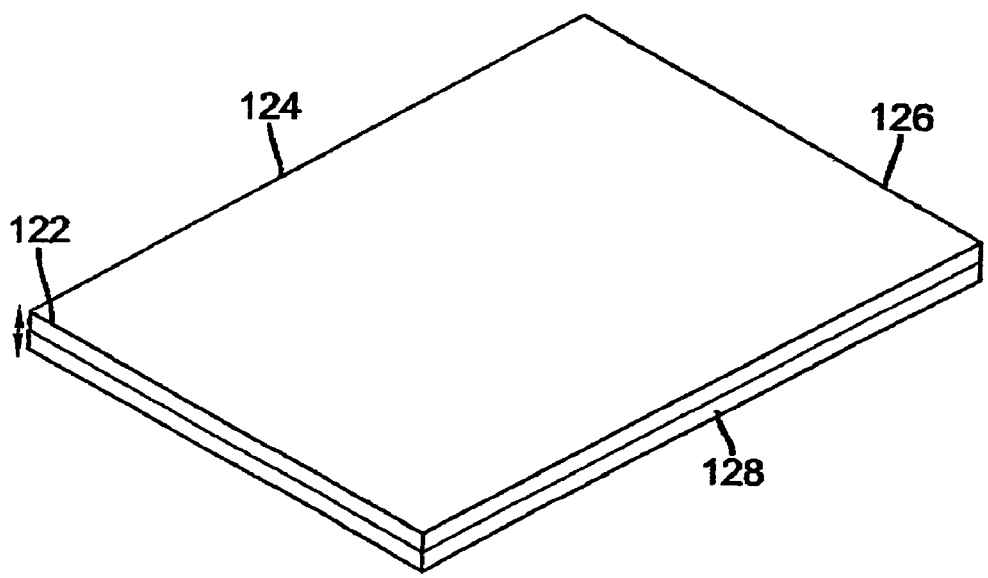

In another embodiment, the constrained activatable stiffening and/or thickening layer may be constrained by limiting, non-continuous areas of nonexpendable material or limiting, non-continuous areas of material that is limited with respect to expansion. FIG. 8A shows another embodiment, with optionally gusseted linkages 122 and 126 before activation the activatable stiffening and/or thickening layer. FIG. 8B shows the embodiment, with optionally gusseted linkages 122, and 126 after activation and expansion of the activatable stiffening and/or thickening layer. FIG. 9A shows a three-dimensional view of FIG. 8, with optionally gusseted linkages 122, 124, 126 and 128 before activation the activatable stiffening and/or thickening layer while FIG. 9B shows the embodiment, with optionally gusseted linkages 122, 124, 126 and 128 after activation and expansion of the activatable stiffening and/or thickening layer.

Figure 11A:
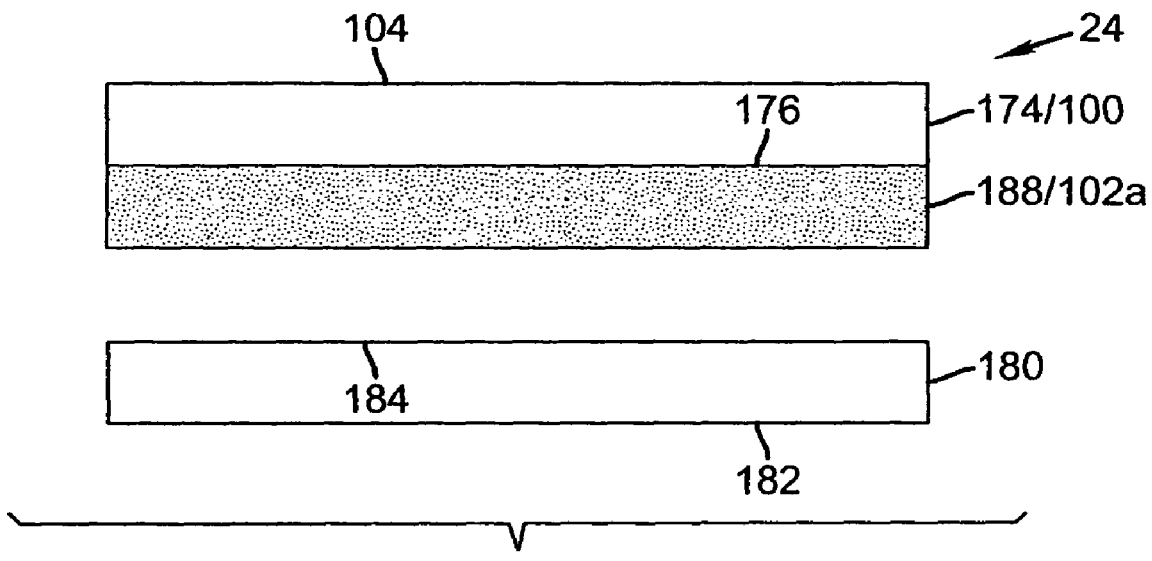
FIGS. 11A-B show a multi-layer constrained embodiment of the activatable stiffening and/or thickening layer, in which the multiple layers are provided in two parts.
Figure 11B:
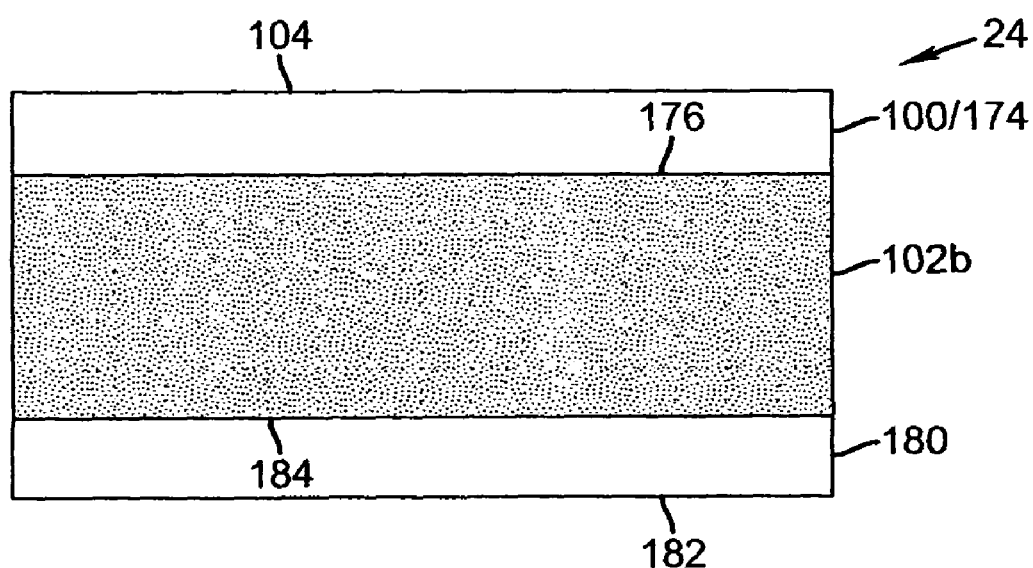

In FIG. 11, a first web 174, comprising a printable layer 100 having a printable surface 104 with a back side 176, is joined to a second web 180, comprising an outside surface 182 and an inside surface 184. Outside surface 182 may also be printable. The webs are combined by joining the back side 176 of first web 174 to the inside surface 184 of second web 180. In this embodiment, one or both of back side 176 and inside surface 184 carries an activatable material 188 that, when activated, expands to fill any available space between webs, providing an activatable stiffening and/or thickening layer 102b.

When first web 174 and second web 180 are joined together, the activatable stiffening and/or thickening layer formed therebetween can optionally be activated by the joining action. In this regard, pressures and/or temperatures or materials used to join first web 174 and second web 180 can have the effect of activating the activatable stiffening and/or thickening layer 102.

Note that printable surface 104 and printable surface 182 can have different characteristics. For example, printable surface 104 can have a glossy surface, and printable surface 182 can have a matte finish. This allows the user of web 174 and 180 to select the characteristics of the print by selecting the web that is presented to the print head. This can be done by reversing the two orientation of two differing rolls of media (not shown). This is also possible with unified media shown in earlier figures such as in FIG. 2 if apparatus is supplied to reverse the feeding from a roll.

Figure 13A:
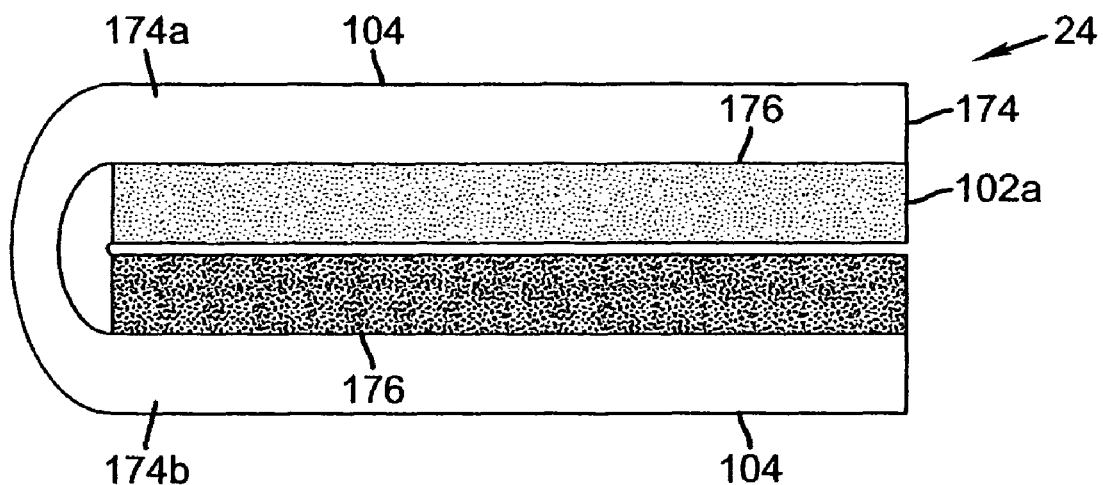
FIGS. 13A-B illustrate cross-sectional views of another multi-layer constrained embodiment, utilizing a single support folded into parts containing the of the activatable stiffening and/or thickening layer.
Figure 13B:
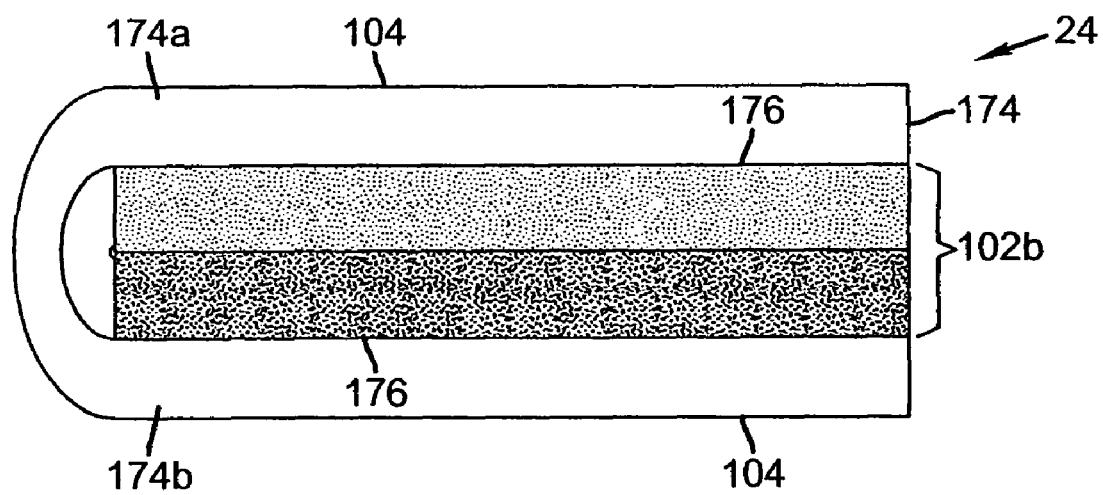

In another embodiment, the two webs may be attached, effectively constraining the activatable layer, by interleaving a two-part medium. FIG. 13 shows, in cross-section, a multi-layer configuration in which a web 174 is folded onto itself such that a first half 174a of web 174 performs the function of a top layer, while a second portion 174b of first web 174 performs the function of a bottom layer, surrounding the activatable stiffening and/or thickening layer. In this way, receiver medium 24, can be maintained at a relatively thin cross section during printing, can be printed, during a single pass through a single print engine and can still provide a receiver medium 24 that is printed on two sides and that has a controllable stiffness and/or thickness increase. The folding in this embodiment allows a reduction in the number of linkages, seen in FIG. 8, FIG. 9, or FIG. 10, that must be made to join first web 174 and second web 180. Activatable stiffening and/or thickening layer 102 can be activated by a later application of an activation energy or activation material.

The expansion of the activatable stiffening and/or thickening layer can also be constrained by physical or structural mechanisms during activation, referred to herein as forming. The activated layer can be held in a chamber of fixed dimension during expansion, limiting the extent of expansion and producing, instead, increased stiffness. For example, as is illustrated in FIG. 14, the receiver medium transport system can convey an activated receiver medium 24 to a forming system 90 comprising a form 117 through which defines a limited height or width through which receiver medium 24 is advanced during the stiffening and/or thickening delay. This constrains the extent of expansion of activatable stiffening and/or thickening layer 102 of receiver medium 24 to provide limitations on the overall thickness of receiver medium 24.

The activatable stiffening and/or thickening layer can be formed or shaped after printing of the image and after application of the activation energy or activating material. The forming can be can be complex or simple as desired. In one embodiment, forming comprises allowing the activatable stiffening and/or thickening layer to travel along a relatively planar travel path during the post activation stiffening delay. A curved or otherwise modified non-planar travel path can be provided during the post activation stiffening and/or thickening delay so as to induce a curve or other configurations. Forming can comprise a warped or otherwise geometrically adjusted portion of activatable stiffening and/or thickening layer that is shaped or otherwise configured to induce the desired configuration at the conclusion of the forming step.

Forming can optionally be combined with the printing step by passing receiver medium 24 through mechanical structures that are used to orient and position receiver medium 24 for printing and which also serve to orient and shape receiver medium 24 in a constrained manner.

Multi-Part Activatable Constrained Layer

Figure 12A:
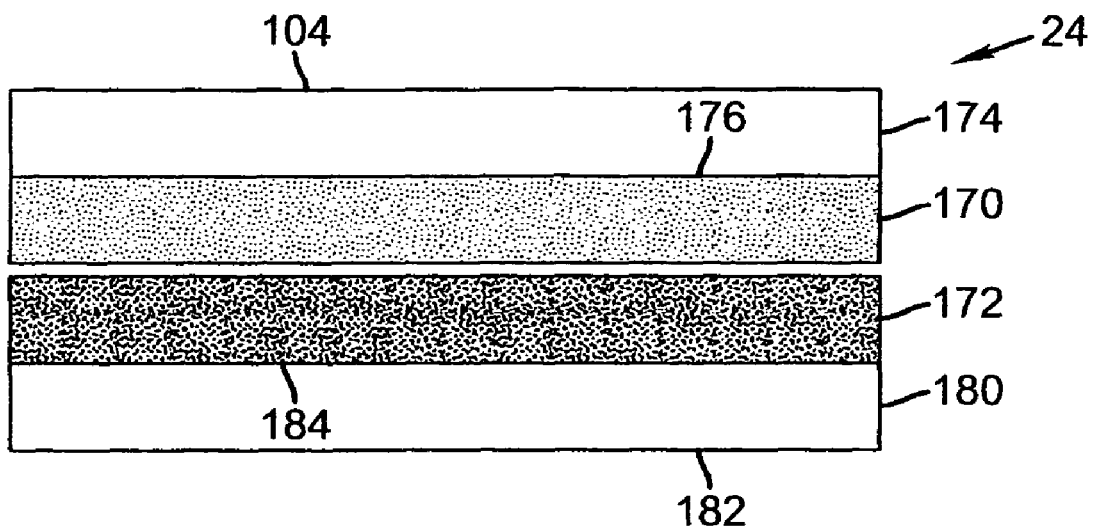
FIGS. 12A-B show another multi-layer constrained embodiment of the activatable stiffening and/or thickening layer, in which the multiple layers are provided in two parts.
Figure 12B:
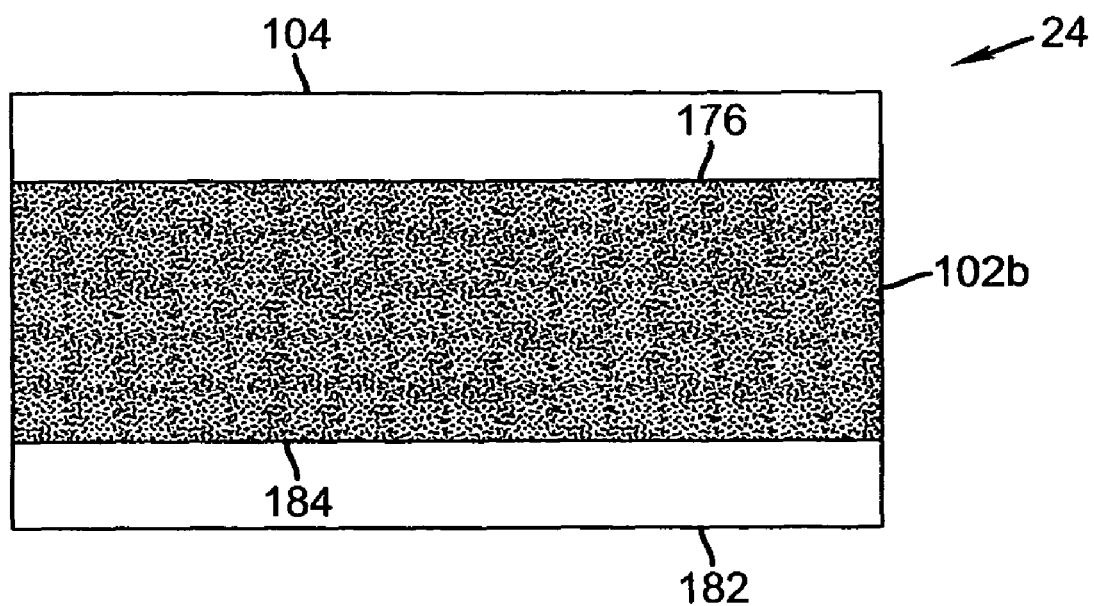

FIGS. 12A and 12B show another embodiment of a receiver medium 24 that has a controllable stiffness and/or thickening increase. In this embodiment, an activatable stiffening and/or thickening layer 102 is provided in two parts, a first part 170 and a second part 172. Optionally, these parts could be separately stored within the printer and joined to form receiver medium 24 while in the printer. In FIG. 12A, a first web 174 that carries first part 170 of activatable stiffening and/or thickening layer 102 is combined with a second web 180 that carries second part 172 of activatable stiffening and/or thickening layer 102 in an orientation that brings first part 170 and second part 172 together. First part 170 and second part 172 form a receiver medium 24 that can be activated to have an increase in stiffness and/or thickness. Any conventional method can be used to combine first web 174 and second web 180, including lamination, the use of adhesives, fasteners and or any other known technique for joining two webs.

In one embodiment, first part 170 and second part 172 react when first web 174 and second web 180 are joined together in a manner that brings first part 170 into contact with second part 172. The reaction can provide the activation of activatable stiffening and/or thickening layer or activation can occur separately. The embodiment shown in FIG. 11 may also be provided in two parts.

The media can further comprise other layers such as adhesive layers, imaging receiving layers or imaging containing layers, UV absorbing layer, antistatic layer and scratch resistant layer and layers with other functional purposes.

Method

In a simple method of use, an unactivated activatable stiffening and/or thickening layer is provided, printing is applied, the activatable stiffening and/or thickening layer is activated and, optionally, formed to produce a printed medium.

Printer

FIG. 15 shows a first embodiment of a printer 20. Printer 20 comprises a housing 21 having a print engine 22 that applies markings or otherwise forms an image on a receiver medium 24. Receiver medium 24 is also referred to herein as any of the embodiments of the activatable stiffening and/or thickening layer, including multi-layer structures. Print engine 22 can record images on receiver medium 24 using a variety of known technologies including conventional four color offset separation printing or other contact printing, silk screening, dry electrophotography such as is used in the NexPress 2100 printer sold by Eastman Kodak Company, Rochester, N.Y., USA, thermal printing technology, drop on demand ink jet technology and continuous inkjet technology. For the purpose of the following discussions, print engine 22 will be described as being of a type that generates color images. However, this is not necessary and the claimed methods and apparatuses can be practiced with a print engine 22 that is adapted to form monotone images such as black and white, grayscale or sepia toned images. Similarly, the methods and apparatuses can be practiced with a print engine 22 that is adapted to deliver images in the form of a pattern of one or more functional materials on receiver medium 24, such as, for example, electrically conductive, insulating, semi-conductive or resistant materials of a type that can be used in combination to form electrical circuits and the like, optical materials of a type that are adapted for form optical conductors, reflectors, lenses and pathways. Other examples of functional materials may include polymers, ceramics, metals and other such functional materials that can be used to form mechanical structures using the receiver medium as a support.

Medium advance 25 is used to position the receiver medium and/or print engine 22 relative to each other to facilitate recording of an image on receiver medium 24. In the embodiment illustrated in FIG. 15, medium advance 25 moves receiver medium 24 from a raw material storage area 76 through a range of printing positions 27, wherein print engine 22 can print an image on receiver medium 24. Medium advance 25 can comprise any number of well-known systems for moving receiver medium 24 within printer 20, including a motor 28, driving pinch rollers 30, a motorized platen roller or other well-known systems for the movement of paper or other types of receiver medium 24.

Print engine 22 and medium advance 25 are operated by a processor 34. Processor 34 may include, for example, a programmable digital computer, a programmable microprocessor, a programmable logic processor, a series of electronic circuits, a series of electronic circuits reduced to the form of an integrated circuit, or a series of discrete components. Processor 34 operates printer 20 based upon input signals from a user input system 36, sensors 40, a memory 60 and a communication system 74.

Processor 34 can receive a print order in a variety of ways including a receiving entries made at user input system 36, receiving signals received at communication system 74, or in response to data provided by way of memory 60 including data provided by way of a removable memory card 68.

Processor 34 can also perform a number of other pre-printing operations, which can include converting digital image data into colors to be printed on receiver medium 24, determining a printing speed for printing using receiver medium 24, determining whether an image can be printed using the loaded type or shape of receiver medium 24, determining whether there is a need to reload the a print medium supply 76, selecting a dye or colorant set for use in printing using receiver medium 24 and/or any other functions necessary to prepare data and materials for print engine 22 can record an image on receiver medium 24. Other examples of such pre-printing operations include determining before printing, whether printer 20 has been loaded with a desired type of print medium 24. Once that the pre-printing operations are complete, processor 34 can cause print engine 22 and, optionally, receiver medium transport path 26 to operate to record an image on the printable layer using print engine 22. The printing can comprise any form of printing known in the art.

User input system 36 can comprise any form of transducer or other device capable of receiving an input from a user and converting this input into a form that can be used by processor 34. For example, user input system 36 can comprise a touch screen input, a touch pad input, a 4-way switch, a 6-way switch, an 8-way switch, a stylus system, a trackball system, a joystick system, a voice recognition system, a gesture recognition system or other such systems. In the embodiment illustrated in FIG. 15, user input system 36 includes a keypad or keyboard 37 and mouse 38 for receiving input from a user. A display 39 is connected to processor 34 and provides information to a user so that the user can interact with printer 20. Various components of user input system 36 and/or display 39 can be located within housing 21 or can be separate therefrom. Where separate, user input system 36 and display 39 can exchange signals with processor 34 by way of wired or wireless signals and connections.

Sensors 40 are provided in printer 20 to sense environmental and other conditions relevant to the operation of printer 20 and to convert this information into a form that can be used by processor 34 in governing operation of print engine 22, and/or other systems of printer 20 including the activation system. Sensors 40 can include audio sensors adapted to capture sounds. Sensors 40 can also include receiver medium positioning sensors and other sensors used internally to control printer operations.

Printer 20 has a memory 60. Memory 60 can include conventional memory devices including solid state, magnetic, optical or other data storage devices. Memory 60 can be fixed within printer 20 or it can be removable. In the embodiment of FIG. 15, memory 60 is shown having a hard drive 62, a disk drive 64 for a removable disk such as an optical, magnetic or other disk memory and a memory card slot 66 that holds a removable memory 68 such as a removable memory card and has a removable memory interface 70 for communicating with removable memory 68. Data, such as control programs, digital images and metadata, can also be stored in a remote memory system 72.

Printer 20 has a communication system 74 for communicating with, for example, remote memory system 72. Communication system 74 can be, for example, an optical, radio frequency circuit having a transducer and appropriate signal processing circuitry to convert image and other data into a form that can be conveyed to a remote device such as remote memory system 72 by way of an optical signal, radio frequency signal or other form of signal. Communication system 74 can also be used to receive a digital image and other information from a host computer or network. Communication system 74 provides processor 34 with information and instructions from signals received thereby.

Printer 20 has an activation system 80 that applies an activating energy or activating material 82 to receiver medium 24, causing receiver medium 24 to stiffen and/or thicken. In general, activation system 80 can comprise an energy source 84 which can be adapted to apply specific types of energy to a receiver medium 24. For example, energy source 84 can apply energy to receiver medium 24 by exposing receiver medium 24 to electromagnetic radiation, heat, and/or light. For example, activating energy 82 can comprise any form of light within the visible or non-visible portions of the spectrum and in such an example, energy source 84 can take the form of any type of light emitter that can deliver the appropriate wavelength and intensity of light necessary to activate the activatable stiffening and/or thickening layer including incandescent light sources, arc lamps, lasers, diodes, infrared emitters and the like.

Also, energy source 84 can apply energy to receiver medium 24 by directing acoustic energy, pressure, or other form of mechanical energy against receiver medium 24. For example, acoustic energy can be applied by way of existing and well known speaker systems or other devices adapted to generate energy that can be conveyed by way of waves of air pressure. Pressure can be applied to receiver medium 24 by a nip-roller or any other well known other structure that applies a load through a thickness dimension of receiver medium 24 as receiver medium 24 passes along medium transport path 26. Such a load will be calibrated to cause the activatable stiffening and/or thickening layer of receiver medium 24 to activate in a way that stiffens and/or thickens the receiver medium 24. Similarly, where receiver medium 24 is activated by an application of an activating material 82, activation system 80 has a material source 86 that is capable of or operable to transfer an activation material 82 onto receiver medium 24 that causes receiver medium 24 to stiffen and/or thicken.

The stiffening and/or thickening process can take some time to complete. This is to prevent receiver medium 24 from stiffening and/or thickening in a shape or manner that is unintended or undesirable. Accordingly, in the embodiment illustrated in FIG. 15, a forming system 90 is shown. Forming system 90 can take many forms including calendaring systems, pinch or nip rollers, pressure plates, and any other form of device that can hold receiver medium 24 in a particular orientation, shape, or form during the stiffening and/or thickening of receiver medium 24.

Receiver medium 24 may be shaped or formed to take on a planar or non-planar form. Forming system 90 can provide structures that constrain, deflect, support or otherwise contact and/or position receiver medium 24 during the stiffening and/or thickening process. The receiver medium forming system 90 can include dynamically variable equipment that processor 34 can control and can adjust as desired. Pneumatically, or electromechanically adjustable actuators and the like can be provided to cause, for example, changes in receiver medium transport path 26, print engine 22, and/or forming system 90 that induce such changes to the shape of receiver medium 24. The forming system 90 can also constrain expansion of expansive type materials during activation as well as the post activation stiffening and/or thickening delay. For example, as is illustrated in FIG. 14, receiver medium transport system can convey an activated receiver medium 24 to a forming system 90 comprising a form 117 which defines a limited height or width through which receiver medium 24 is advanced. This constrains the extent of expansion of activatable stiffening and/or thickening layer of receiver medium 24 to provide limitations on the overall thickness of receiver medium 24.

In the embodiment shown in FIG. 15, printer 20 is shown as having an optional supplemental print engine 23 that is positioned for printing on a side of receiver medium 24 that is opposite from print engine 22. Supplemental print engine 23 can be positioned to print on receiver medium 24 before, during or after receiver medium 24 has been exposed to print engine 22, activation system 80 or forming system 90.

Printing Using the Activatable Stiffening and/or Thickening Layer

Typically, printer 20 will be adapted to receive one particular type of receiver medium 24. In such a case, processor 34 can determine the extent and nature of the exposure based upon preprogrammed characteristics and data such as charts, tables, or algorithms or other logical structures that correlate an amount of activation energy or activation material 82 with an extent of stiffening and, optionally, expansion of activatable stiffening and/or thickening layer 102. In other embodiments, printer 20 may receive multiple types of receiver media that are each capable of stiffening using a different material, or using a different mechanism and, therefore, having different needs for exposure to an activating energy or activating material 82. Where printer 20 can receive such different types of receiver media, printer 20 can be adapted to provide sensors 40 to detect a type of media loaded in printer 20. Examples of such a sensor 40 include bar code sensors, RFID sensors, contact sensors that can detect a thickness and/or stiffness or other characteristic of receiver media that is indicative of a type of receiver or manual input devices that allow a user of printer 22 to designate the type of media loaded therein. Accordingly, sensors 40 can incorporate any of receiver medium determining systems known in the art.

Processor 34 can use the different data obtained from sensor 40 to determine a type of media and, can use the print order information and/or the determined media type to calculate an extent of, or type of, exposure appropriate for the receiver medium and the type of output desired or indicated by the a print order data. Printer 20 is capable of printing on one or both sides of receiver medium 24.

Figure 16:
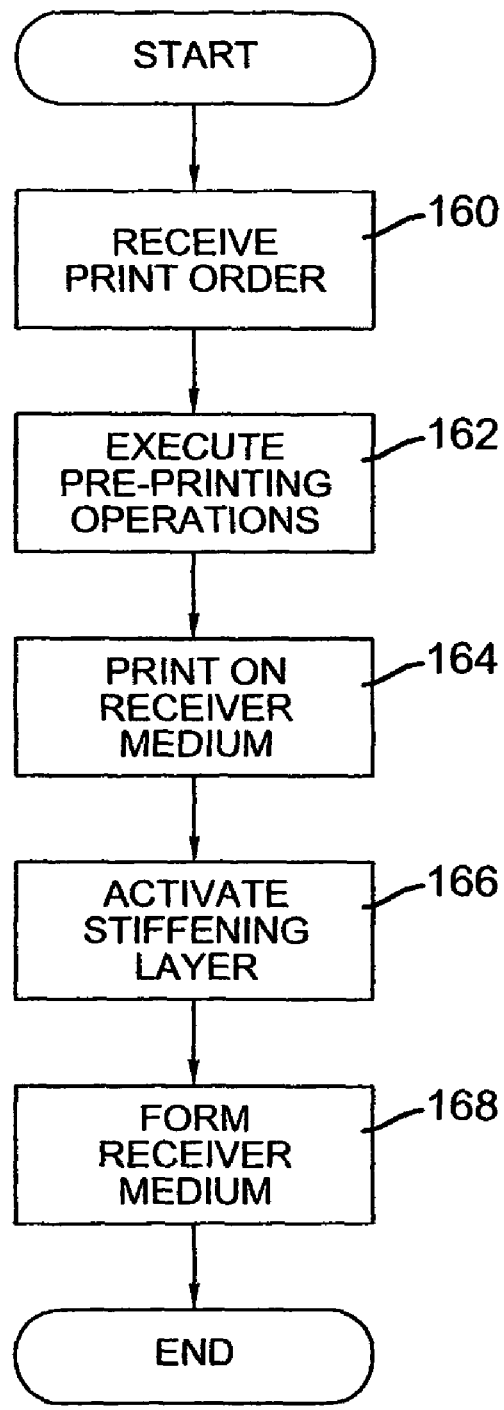
FIG. 16 provides a flow diagram showing one embodiment of a method for operating a printer using a receiver medium with an activatable stiffening and/or thickening layer.

FIG. 16 provides a flow diagram showing one embodiment of a method for printing using any of the embodiments of activatable stiffening and/or thickening layer disclosed herein. As is shown in the embodiment of FIG. 16, a print order is received by the printer (step 160). The print order provides instructions sufficient for processor 34 to begin a print sequence and can include an instruction to print an image, the image data for the image to be printed, print quantity information or information identifying a selected print medium upon which the image is to be printed. The print order can also contain instructions regarding the desired stiffness and optionally the desired thickness of the printed receiver medium and can indicate if the receiver medium is to be activated or not activated. If the print order does not contain such instructions, the processor 34 can be programmed to automatically determine activation criteria for the receiver medium.

As shown in FIG. 16, the processor receives the print order and initiates a series of pre-printing operations. During the pre-printing operations (Step 162), the processor causes receiver medium transport system to execute a receiver medium loading process. During this process, the processor sends signals causing medium advance to move print medium from a storage location to a range of printing positions within which print engine can print on printable layer. Other pre-printing operations can include converting digital image data into colors to be printed on the receiver medium, determining a printing speed for printing using receiver medium, determining whether an image can be printed using the loaded type or shape of receiver medium, determining whether there is a need to reload the a print medium supply, selecting a dye or colorant set for use in printing using receiver medium and/or any other functions necessary to prepare data and materials for print engine can record an image on the receiver medium, and determination of exposure based upon an anticipated post activation stiffening delay during which the receiver medium 24 can be shaped after printing of the image and after application of the activation energy or activating material.

Once the pre-printing operations are complete, the processor can cause the print engine and, optionally, the receiver medium transport path to operate to record an image on the printable layer using the print engine (Step 164). The printing can comprise any form of printing known in the art. The printing may be adjusted to compensate for known changes induced by activation.

The receiver medium is then activated by being exposed to an activation energy or an activation material by the activation system (step 166).

After activation of the receiver medium, the forming step (step 168) is optionally executed. The forming step may follow a curved or otherwise modified non-planar travel path during any post activation stiffening and/or thickening delay. The forming step 168 can induce more complex shape and orientation variations in receiver medium and can include other processes, such as stamping, embossing, folding, twisting or otherwise adjusting the shape of the receiver medium. Forming step 168 can be performed in a consistent manner on each of a series of receiver medium printed by printer or it can be dynamically adjusted to the needs of each individual receiver medium.

While final activation is employed after printing of an image in the process of the invention to enable printing on a receiving media that is relatively thinner and/or less stiff than the media after printing and activation, partial activation of receiver medium 24 can occur before printing. In certain embodiments of printer 20, pre-printing partial stiffening and/or thickening of receiver medium 24 can be put to advantageous effect. In particular, receiver medium 24 is conventionally moved relative to a core by providing a receiver medium transport path 26 that advances the receiver medium using a plurality of pairs of motor driven pinch rollers that are arranged to pull rather than push the receiver medium 24 along the receiver medium transport path 26. One of the principle reasons for this is that receiver medium is typically relatively pliable and tends to flex and/or get caught within the receiver medium transport path 26 when pushed or thrust through the system. This makes it difficult to properly position receiver medium 24 by thrusting receiver medium 24 from the supply end. Pre-printing partial stiffening of media, e.g., may be employed to control stiffening such that the media would transport through the system more effectively while still maintaining a required degree of flexibility to enable transport through a tortuous printing path, with final activation and complete stiffening and/or thickening performed after printing to obtain a printed image with desired final stiffness.

As previously mentioned, the activatable stiffening and/or thickening layer, including multi-layer structures, is envisioned for use as receiver media to be printed upon to form images, text, graphics, textures or any other form of printable subject matter on a printable surface. Application is expected in birth announcements, birth certificates, marriage certificates, college diplomas, business cards, post cards, photopaper, mounted photographs. The media would find use in thermal, electrophotographic and ink jet printers, conventional consumer and retail sheet fed and roll fed digital printers, the EasyShare® line of photo printers, integrated printing/deployment device such as portable printers, and printing digital cameras. In addition, post printing in-line deployment devices such as kiosks and large format printers for posters and signage could be configured with a user selectable print thickness utilizing the same media stock.

Although described primarily for use as conventional printed image receiver media, the activatable stiffening and/or thickening layer, including multi-layer structures can be used for other printing applications. Potential application may exist in the manufacture of printed packaging materials and preformed packages such as boxes, envelopes, cups, cup jackets, food containers, origami, furniture, bubble-pack envelopes and other three-dimensional objects, where thickening and/or stiffening after printing would be advantageous in formation of such printed objects.

Figure 17A:
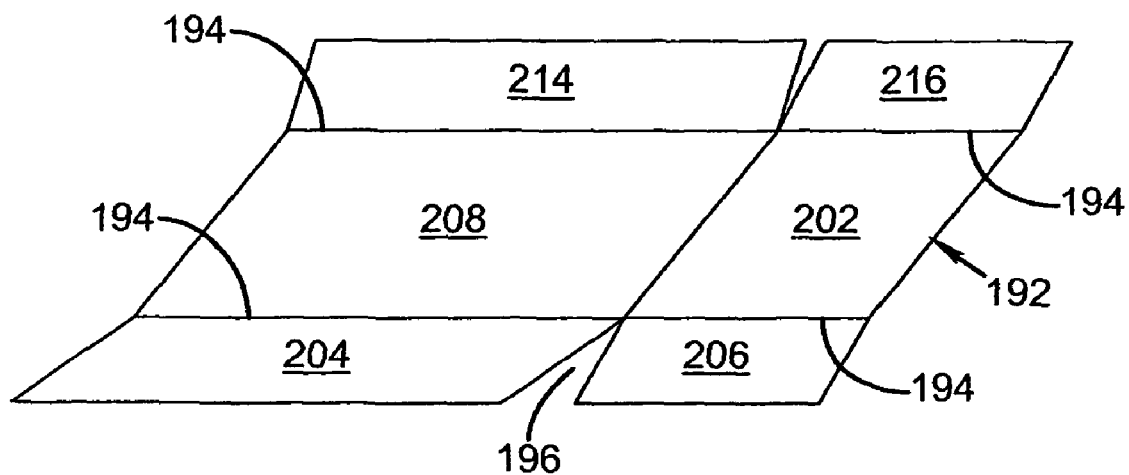
FIGS. 17A-D illustrate the formation of a box using an embodiment of the activatable stiffening and/or thickening layer.
Figure 17B:
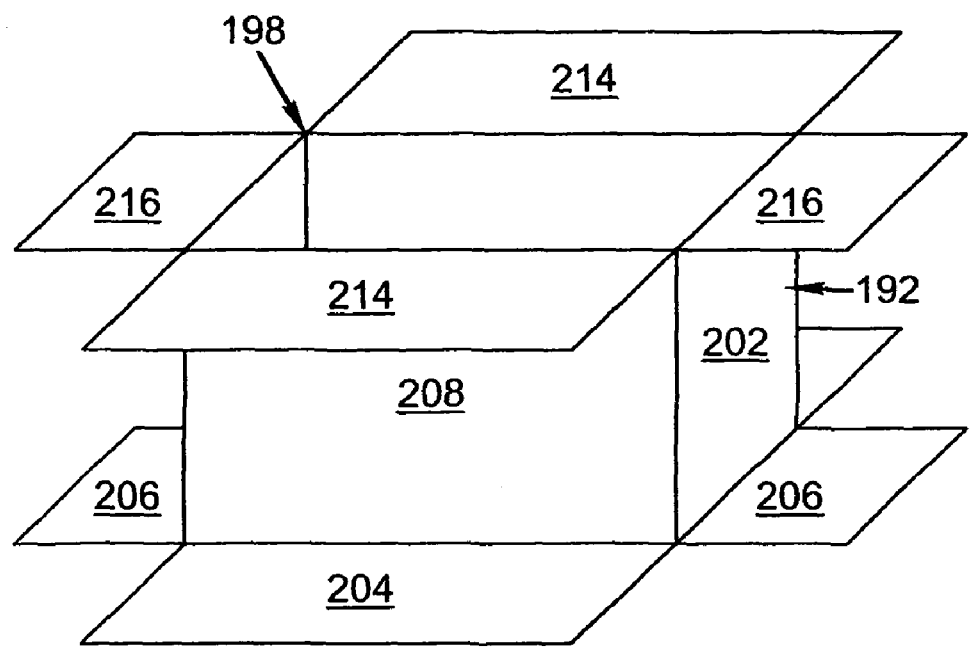
Figure 17C:
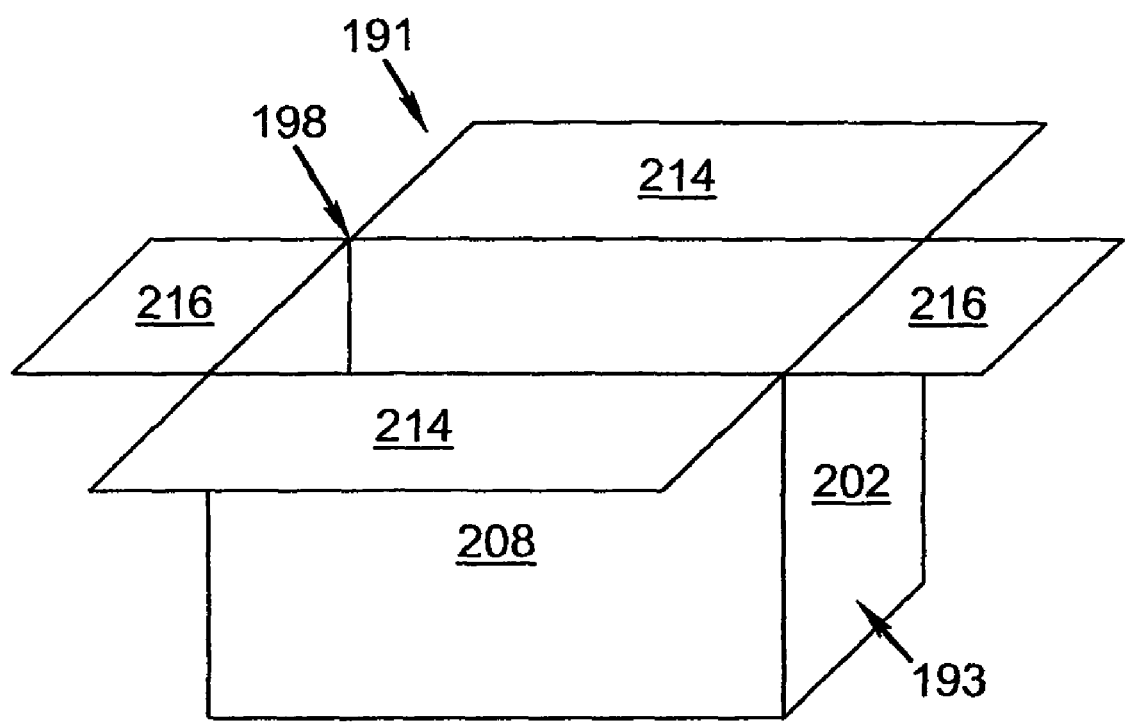
Figure 17D:
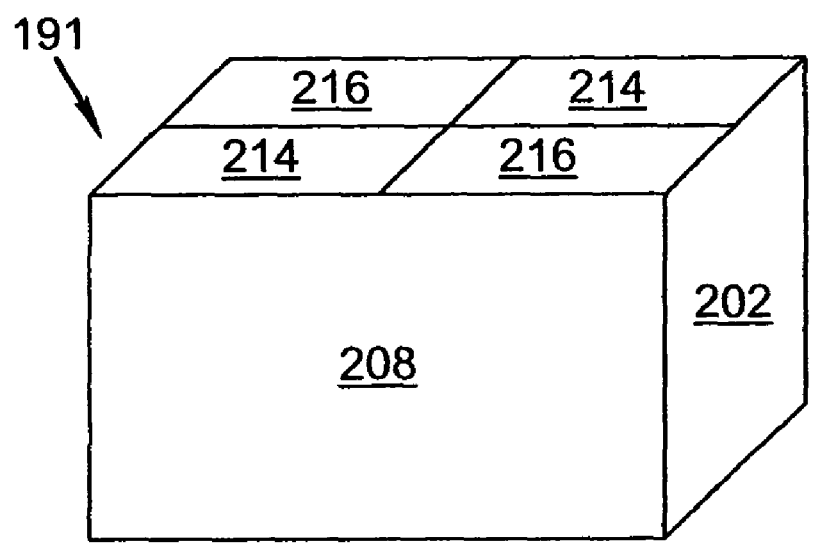

Activatable stiffening and/or thickening layer, including multi-layer structures, is capable of being formed in any of a variety of shapes, some by the forming system, and can be subject to multiple forming steps. FIGS. 17A-D illustrate one example wherein various forming steps have been applied that cause the activatable medium to stiffen and/or thicken in the form of a box 191. FIG. 17A shows a plan view of a first segment 192 of activatable medium that as a controllable stiffness and/or thickness after a first forming step in which flex areas 194 and cuts 196 are placed on the activatable medium. FIG. 17B shows a plan view of a partially assembled pre-formed box 191 made by joining first segment 192 of the activatable, folded and cut medium to a matching second segment 198 that is formed in the same fashion as first segment 192. FIG. 17C shows a plan view of an assembled pre-formed box 193. In a folding step, box folding sections 204 and 206 are folded inwardly to form a bottom for the box. Box top folding sections 214 and 216 are then shown as being left open to facilitate loading. Images may be advantageously printed on segments 192 while in flat form, and subsequently formed Box 191 can be activated and left to stiffen and/or thicken in an open position if desired. Alternatively, the activatable medium can be activated such that the box 190 stiffens and/or thickens after loading, allowing closure of box 191 as shown in FIG. 1B, which shows a plan view of an assembled and loaded box 191 fully activated with box top folding sections 214 and 216 moved into a closed position after activation but before stiffening and/or thickening is completed. Where this is done, the stiffening and/or thickening acts to keep box 191 in a closed position.

Any stiffening and/or thickening of the activatable medium after the performing of a forming step advantageously allows the stiffening and/or thickening to increase the ability of the activatable medium to retain the formed shape. This provides a superior structure as compared to a structure that is formed from material that have an initial stiffness and/or thickness and that is bent, flexed or distorted against the initial stiffness and/or thickness.

When the activation system is addressable, the medium for construction of an object such as a box need not have flex areas 194 formed prior to activation. The flex areas can be formed by omitting activation. When the printing and activation systems are in known registration, folding and cutting marks can be supplied for secondary operations after printing and activation. Both folding and cutting can be facilitated by printed indications and lack of activation of the medium.

Figure 18A:
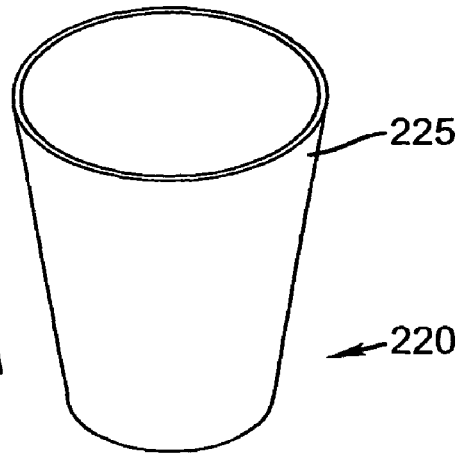
FIGS. 18A-C illustrates the formation of a cup using an embodiment of the activatable stiffening and/or thickening layer.
Figure 18B:
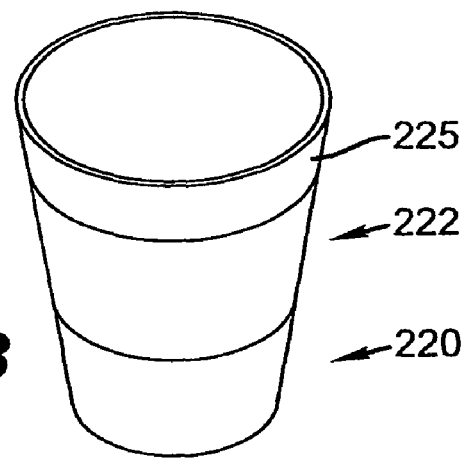
Figure 18C:
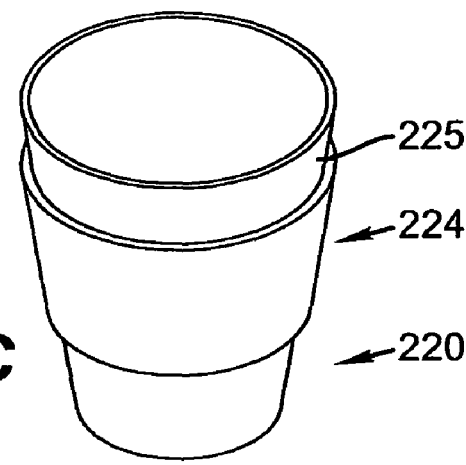
Figure 19A:
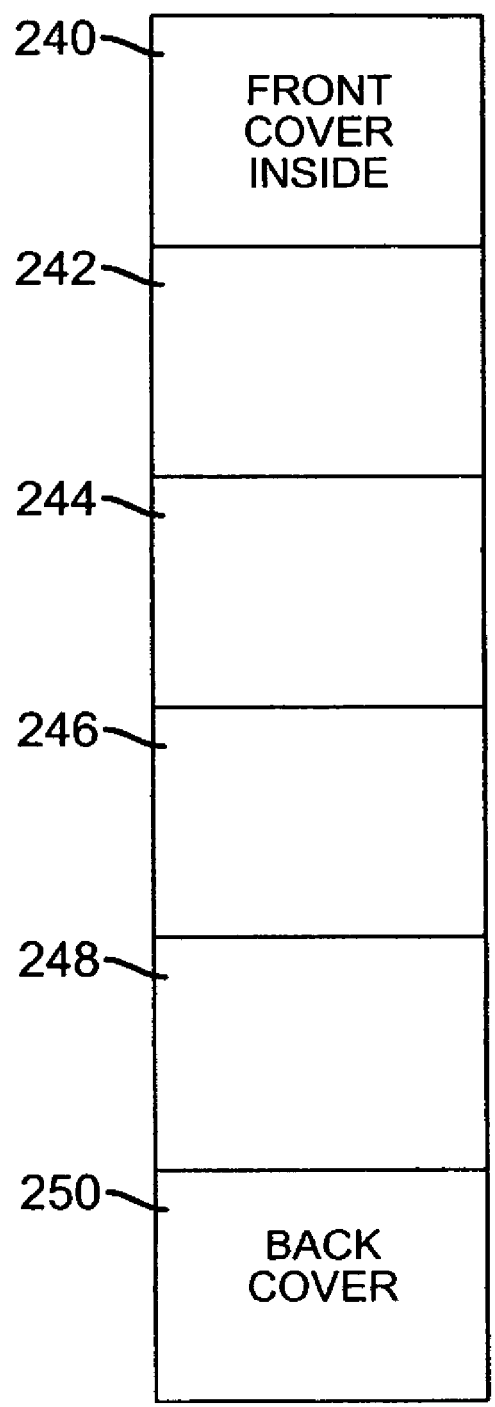
FIGS. 19A-D illustrate a continuous segment of an embodiment of the activatable stiffening and/or thickening layer used to form a printed book.
Figure 19B:
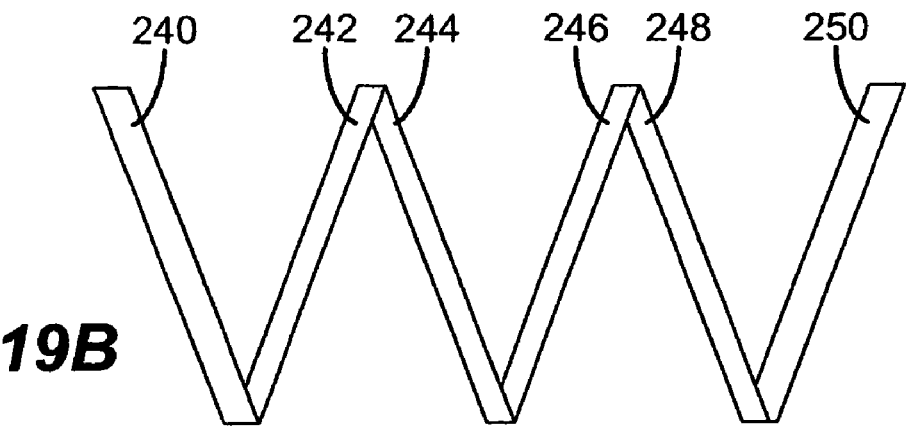
Figure 19C:
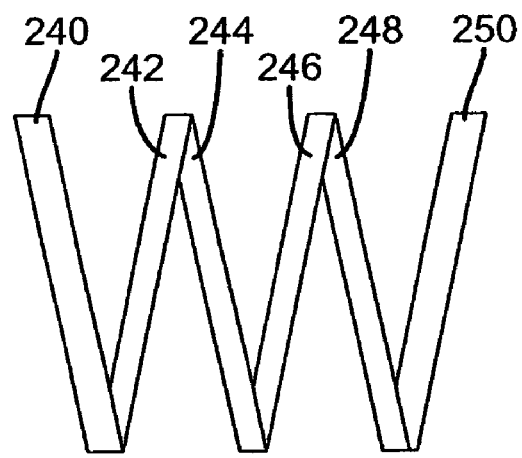
Figure 19D:
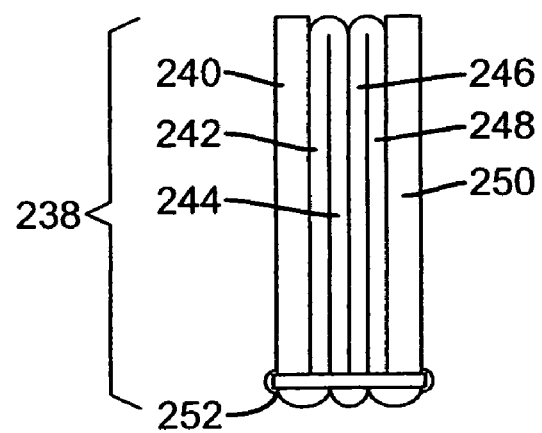

In another example, an activatable medium can be drawn, stretched or otherwise formed into a sheet to form a three dimensional shape having stiffness reinforcing characteristics in strategic places. In FIGS. 18A-C, a plan view is provided of an empty hot beverage container 220 formed by, for example, by drawing, molding, shaping or coiling an activatable medium 25 into a cup like shape and selectively heating a portion 222 thereof (FIG. 18B) to form a stiffening and/or thickening ring 224 around cup 220 (FIG. 18C). Heating can be affected by simple addition of the hot beverage. In this embodiment, stiffening and/or thickening ring 220 is illustrated as protruding from cup 220 however this is not necessary. The addition of thickening ring 224 around cup 220 can have the advantageous effect of compact storage when not in use while providing insulation, due to lower density, between the hot beverage and the hand of the user when the cup is in use.

In still another embodiment, FIGS. 19A-D illustrate how a single section of activatable medium 225 can be used to form a printed book 238 having a front cover portion 240, printed pages 242, 244, 246, and 248 and a back cover portion 250. Activatable medium 225 is page-wise selectively activated and formed after printing so that front cover portion 240 and back cover portion 250 have a stiffness that is greater than a stiffness of printed pages 242, 244, 246 and 248. Front cover portion 240 and back cover portion 250 can, optionally, have a thickness and/or stiffness that is greater than a thickness and/or stiffness of printed pages 242, 244, 246 and 248.

Book 238 is formed simply by folding the pages together as illustrated and by applying a fastener 252 to hold book 238 together. Front cover portion 240 and back cover portion 250 can be printed upon on either side by a printer using a print engine. It will be appreciated that similar results can be obtained by arranging and binding or otherwise joining a similar plurality of printed individual sheets of activatable medium 225 having two sheets formed with a greater stiffness and optionally a greater thickness for containing sheets having a lesser stiffness and optionally a lesser thickness.

Figure 20A:
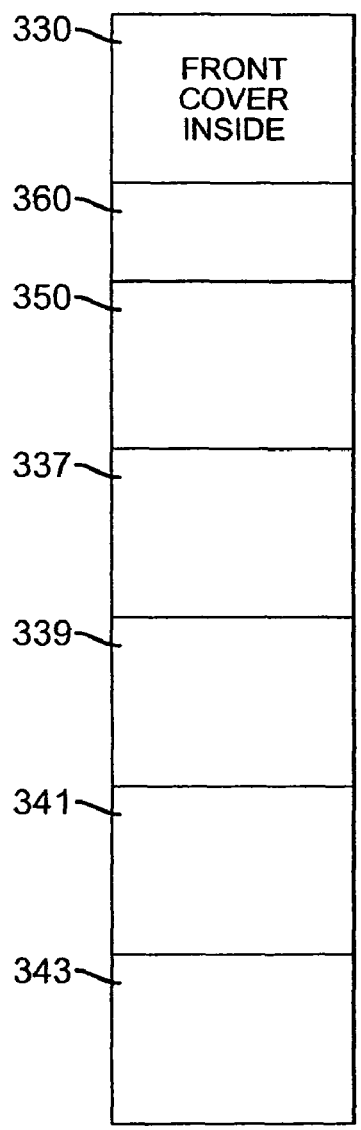
FIGS. 20A-C illustrates a continuous segment of another embodiment of the activatable stiffening and/or thickening layer used to form a printed book.
Figure 20B:
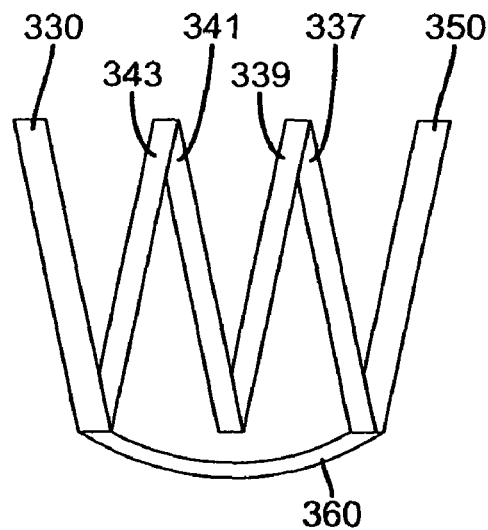
Figure 20C:
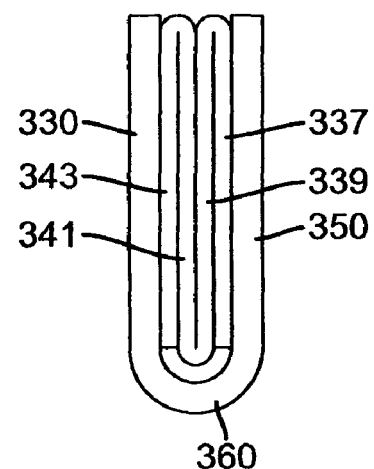

As shown in FIG. 20, book 320 is formed in a similar manner, except that no fastener is used. Front cover 330 and back cover 350 are joined by flexible binding area 360. Front cover 330 and back cover 350 are slightly longer that pages 337, 339, 341 and 343 so that the pages are protected by the cover. Back cover inside 345 is also slightly longer for this same reason. Front cover 330 and back cover 350 are selectively page-wise activated to provide more stiffness and/or thickness than pages 337, 339, 341 and 343, which are not activated. Flexible binding area 360 is not activated so that front cover 330 and back cover 350 are spaced so as to accommodate the thickness of pages 337, 339, 341 and 343 and also back cover inside 345 and front cover inside 335. Back cover inside 345 and front cover inside 335 may also be activated to provide more stiffness and/or thickness to the front and back of book 320.

The irregular lengths of front cover 330, back cover 350 are enabled by the roll fed nature of the printing and activation system as shown in FIG. 14. The media used for creating book 330 may have adhesive on the back (not shown) to bind the non-printed backsides of adjacent printed pages. This adhesive may be activated by a different method than the activation of the stiffness and/or thickness of the media. For example, if pressure is used to activate stiffness and/or thickness, heat may be used to activate the back side book forming adhesive. The following examples are provided to illustrate the invention.

Example 1

An image receiving element comprising an unactivated activatable stiffening and/or thickening layer between two adjacent layers for use in accordance with an embodiment of the invention was generated by laminating two sheets of "Swell Touch" capsule paper, made by Zychem Ltd. based in the United Kingdom, each comprising a front side marking surface layer and a backside non-marking swelling layer comprising expandable Expancel Micro-spheres in a polymer matrix, with the two sheets being laminated back swelling surface to back swelling surface. Capsule paper itself is intended for use in a manner wherein Braille and tactile diagrams are created via differential swelling by using a mark on the front side writing surface which causes the adjacent area on the back side non-marking swelling surface to swell in an outline pattern similar to that of the mark when exposed to IR energy absorbed by the mark and converted to heat. The combined sheeting was placed into a holder to confine the swelling material in the X-axis and Y-axis and to confine the overall thickness of the laminated material to the desired final thickness in the Z-axis upon activation. After printing an image on such laminated sheeting, the swelling layer may be uniformly activated by application of heat, wherein the range of uniform thickness expansion can be controlled by this Z-axis confinement from 0 (e.g. no expansion, stiffness increase) to approximately 0.15 inch (0.38 cm) depending on the thickness of the confinement space.

Example 2

A sheet of photo quality ink jet receiver material was laminated to a sheet of "Swell Touch" capsule paper, non-imaging side of the ink jet receiver to the back side non-marking swelling surface of the capsule paper. After printing of an image on the imaging side of the ink jet receiver, the range of thickness expansion of this configuration can also be controlled by this Z-axis confinement from 0 (e.g. no expansion, stiffness increase) to approximately 0.10 inch (0.25 cm) depending on the thickness of the confinement space.

Example 3

A printer utilizing receiver media according to the present invention can store comparatively large amounts of receiver media without a corresponding increase in size of the storage area. For example, Table I provides various comparative size of Paper Thickness for conventional paper media:

TABLE I

Example Thickness

| | |
|---|---|
| Copier paper = | 4 mils thick |
| Business cards = | 11 mils thick |
| Photographs = | 8 to 11 mils thick |
| Postcard = | 7 mils to 16 mils |
| Book Cover = | 70-150 mils |

(10 mil = 0.01 inch [international, U.S.])

A stack of 100 sheets of unprinted photographic stock would stand between 800 and 1100 mils high and would yield a stack of printed photographs that are at least as thick as the unprinted stack. However, when the inventive process employing activatable receiver media as described in Example 1 is used in a printer, it becomes possible to use a stack of 100 sheets of unprinted activatable paper that stands between only 20 and 27.5 mils high to yield an equivalent stack of printed photographic stock with each activated sheet having a thickness of between 8 and 11 mils with the resulting printed stack standing between 800 and 1100 mils high. Similarly, such stack of 100 sheets of unprinted unactivated paper standing the same 20-27.5 mil can be activated to a desired extent to alternatively yield a stack of activated paper having a thickness between 500 and 1500 mils high.

Examples 4-8

Activatable samples comprising a thickening/stiffening layer were made by coating a polyurethane layer on the backside non-marking swelling layer of "Swell Touch" capsule paper and covering with a plain paper sheet. The thickness of the capsule paper was 4.8 mil and that of the plain paper was 3.9 mil. The thickness of the formed paper for the examples was 8.7 mil. The formed paper was sent through two rollers of a thermal laminator at 240° F. with a preset clearance. The formed paper expanded when it hit the thermal rollers and the thickness was determined by the set clearance between two rollers. A comparative example was made by putting a sheet of the plain paper through the thermal laminator as well. The thickness of the formed paper prior and after thermal laminator was measured according to ASTM D5974. The stiffness of the formed paper prior and after thermal laminator was measured as Taber stiffness according to ASTM D5342. The following Table TI lists the thickness and stiffness of the comparative example and the thickening/stiffening examples prior and after thermal laminator.

TABLE II

Summary of thickness and stiffness

| | Thickness prior to laminator mil | Thickness after laminator mil | Taber stiffness prior to laminator | Taber stiffness after laminator |
|---|---|---|---|---|
| Example 4 | 8.7 | 25.1 | <10 | 123 |
| Example 5 | 8.7 | 27.9 | <10 | 347 |
| Example 6 | 8.7 | 52 | <10 | 102 |
| Example 7 | 8.7 | 103.3 | <10 | 881 |
| Example 8 | 8.7 | 110.4 | <10 | 310 |
| Comparative example | 3.9 | 3.9 | <10 | <10 |

Table II clearly shows that the thickness and stiffness of the activatable samples increased after passage through the thermal laminator, while the thickness and stiffness of the comparative example did not change. Such activatable samples may be printed with an image prior to final activation to a desired thickness and stiffness.

The invention has been described in detail with particular reference to certain preferred embodiments thereof, but it will be understood that variations and modifications can be effected within the spirit and scope of the invention.

PARTS LIST

| | |
|---|---|
| 20 | printer |
| 21 | housing |
| 22 | print engine |
| 23 | supplemental print engine |
| 24 | receiver medium |
| 25 | medium advance |
| 26 | receiver medium transport path |
| 27 | printing positions |
| 28 | motor |
| 30 | driving pinch roller |
| 32 | pinch roller |
| 34 | processor |
| 36 | user input system |
| 37 | key pad/keyboard |
| 38 | mouse |
| 39 | display |
| 40 | sensors |
| 60 | memory |
| 62 | hard drive |
| 64 | disk drive |
| 66 | card slot |
| 68 | removable memory card |
| 70 | removeable memory interface |
| 72 | remote memory system |
| 74 | communication system |
| 76 | receiver medium storage area |
| 80 | activation system |
| 82 | activating energy or activation material |
| 84 | energy source |
| 86 | material source |
| 90 | forming system |
| 100 | printable layer |
| 102 | activatable stiffening and/or thickening layer |
| 102a | unactivated activatable stiffening and/or thickening layer |
| 102b | activated activatable stiffening and/or thickening layer |
| 104 | printable surface |
| 106 | support layer |
| 108 | cells |
| 109 | cell walls |
| 110 | first material |
| 112 | second material |
| 113 | openings |
| 114 | expandable material |
| 115 | stiffened and/or thickened combination material |
| 116 | matrix material |

-continued

PARTS LIST

| | |
|---|---|
| 117 | form |
| 122 | linkage |
| 124 | linkage |
| 126 | linkage |
| 128 | linkage |
| 160 | receive print order step |
| 162 | load receiver medium step |
| 164 | print on receiver medium step |
| 166 | activate receiver medium |
| 168 | forming receiver medium step |
| 170 | first part of activatable stiffening and/or thickening layer |
| 172 | second part of activatable stiffening and/or thickening layer |
| 174 | first web |
| 174a | first half of first web |
| 174b | second half of first web |
| 176 | back side of first web |
| 180 | second web |
| 182 | outside surface of second web |
| 184 | inside surface of second web |
| 188 | activatable expandable material |
| 191 | box |
| 192 | first segment |
| 193 | pre-formed box |
| 194 | flex areas |
| 196 | cuts |
| 198 | second segment |
| 202 | side folding portion |
| 204 | bottom folding portion |
| 206 | bottom folding portion |
| 208 | side folding portion |
| 214 | top folding portion |
| 216 | top folding portion |
| 220 | beverage container |
| 222 | activated portion |
| 224 | activatable stiffening and/or thickening ring |
| 225 | activatable medium |
| 238 | printed book |
| 240 | front cover |
| 242 | page |
| 244 | page |
| 246 | page |
| 248 | page |
| 250 | back cover |
| 252 | fastener |
| 320 | book |
| 330 | front cover |
| 335 | front cover inside |
| 337 | page A |
| 339 | page B |
| 341 | page C |
| 343 | last page |
| 345 | back cover inside |
| 350 | back cover |
| 360 | flexible binding area |

The invention claimed is:

1. A method of forming a printed image on an image receiving element comprising:
   providing an image receiving element comprising at least one activatable stiffening and/or thickening layer which comprises a polymer matrix and an activatable material;
   printing an image over a designated area of said image receiving element, and
   substantially uniformly and non-imagewise activating said activatable stiffening and/or thickening layer over the designated area of said image receiving element after the printing of the image to produce a printed image receiving element with uniform and non-imagewise activated stiffened and/or thickened layer.

2. The method of claim 1, wherein said activatable stiffening and/or thickening layer is a thickening layer, and wherein the image receiving element is substantially uniformly thickened over the designated area.

3. The method of claim 1, wherein said activatable stiffening and/or thickening layer is constrained to limit expansion of said activatable stiffening and/or thickening layer, resulting in substantially uniform stiffening of the image receiving element over the designated area.

4. The method of claim 3, wherein said activatable stiffening and/or thickening layer is constrained by continuous layers surrounding said activatable stiffening and/or thickening layer.

5. The method of claim 3, wherein said activatable stiffening and/or thickening layer is constrained by limiting areas surrounding said activatable stiffening and/or thickening layer.

6. The method of claim 3, wherein said activatable stiffening and/or thickening layer is constrained by a form.

7. The method of claim 1, wherein said activatable stiffening and/or thickening layer is a stiffening layer.

8. The method of claim 1, wherein the image receiving element further comprising at least one layer on a first side of said activatable stiffening and/or thickening layer and at least one layer on the opposite side of said activatable stiffening and/or thickening layer.

9. The method of claim 1, wherein said activatable stiffening and/or thickening layer is activated by heat, pressure, acoustical energy, radiation, chemical reaction, or a combination thereof.

10. The method of claim 1, wherein said activatable stiffening and/or thickening layer comprises at least two parts.

11. The method of claim 10, wherein said at least two parts are activated at combination.

12. The method of claim 10, wherein said two parts comprise more than one type or variety of unactivated activatable stiffening and/or thickening layer.

13. The method of claim 1, wherein said polymer matrix comprises thermoplastic polymers selected from the group consisting of vinylidene chloride, acrylonitrile, methylmethacrylate, polystyrene, polyacrylic, polyxylyene, polyvinylcarbazole, polyester, polyamide, polyimide, polycarbonate, polyether, polyketone, polyphenylene, polysulfide, polysulfone, and cyclic polyolefin.

14. The method of claim 1, wherein said activatable material is confined within cells.

15. The method of claim 14, wherein said cells comprise microspheres.

16. The method of claim 14, wherein said cells contain an expandable material that expands to pressurize the cells.

17. The method of claim 1, wherein said activatable material is a super-absorbing polymer.

18. The method of claim 1, wherein said activatable material is a foaming agent.

19. The method of claim 1, further comprising the step of partially activating the activatable material at least one of before and during printing and wherein said printed image comprises images, text, graphics, or textures.

20. The method of claim 1, wherein said printing comprises printing an image on two sides of said image receiving element.

* * * * *